United States Patent
Sekiguchi et al.

(10) Patent No.: US 9,560,365 B2
(45) Date of Patent: Jan. 31, 2017

(54) IMAGE CODING DEVICE, IMAGE DECODING DEVICE, IMAGE CODING METHOD, AND IMAGE DECODING METHOD

(71) Applicant: MITSUBISHI ELECTRIC CORPORATION, Tokyo (JP)

(72) Inventors: Shunichi Sekiguchi, Tokyo (JP); Kazuo Sugimoto, Tokyo (JP); Yusuke Itani, Tokyo (JP); Yoshihisa Yamada, Tokyo (JP); Daiki Kudo, Tokyo (JP); Hirofumi Nishikawa, Tokyo (JP); Junichi Kitsuki, Tokyo (JP); Koichi Takeuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 372 days.

(21) Appl. No.: 14/376,776

(22) PCT Filed: Feb. 28, 2013

(86) PCT No.: PCT/JP2013/055451
§ 371 (c)(1),
(2) Date: Aug. 5, 2014

(87) PCT Pub. No.: WO2013/129585
PCT Pub. Date: Sep. 6, 2013

(65) Prior Publication Data
US 2014/0376613 A1    Dec. 25, 2014

(30) Foreign Application Priority Data

Feb. 29, 2012  (JP) .................................. 2012-043456
Oct. 4, 2012  (JP) .................................. 2012-221775

(51) Int. Cl.
H04N 7/12      (2006.01)
H04N 19/40     (2014.01)
(Continued)

(52) U.S. Cl.
CPC ............ *H04N 19/40* (2014.11); *H04N 9/7921* (2013.01); *H04N 19/107* (2014.11);
(Continued)

(58) Field of Classification Search
CPC .... H04N 19/40; H04N 19/107; H04N 19/137; H04N 19/154; H04N 19/179; H04N 19/50; H04N 5/91; H04N 9/7921; H04N 9/8042; G11B 2020/10537
(Continued)

(56) References Cited

U.S. PATENT DOCUMENTS

2002/0036717 A1  3/2002  Abiko et al.
2006/0210248 A1  9/2006  Yamashita
(Continued)

FOREIGN PATENT DOCUMENTS

JP   07 143494 A    6/1995
JP   09-093592 A    4/1997
(Continued)

OTHER PUBLICATIONS

"Image Identification Technology(Visual Signature)" Mitsubishi Electric Technical Report, Nov. 2011.
(Continued)

*Primary Examiner* — Allen Wong
(74) *Attorney, Agent, or Firm* — Birch, Stewart, Kolasch & Birch, LLP

(57) ABSTRACT

An intra-scene and inter-scene adaptive coding unit 6 converts an MPEG-2 video bit stream into a slave stream by using both coded data which is included in the coded data about scene video units in a master stream recorded in a data
(Continued)

recording unit 2 and for which alternative coded data to be used for prediction reference has not been retrieved by an inter-scene prediction determining unit 5, and coded data retrieved by the inter-scene prediction determining unit 5 for the prediction reference.

7 Claims, 13 Drawing Sheets

(51) Int. Cl.
    *H04N 9/79*       (2006.01)
    *H04N 19/107*     (2014.01)
    *H04N 19/154*     (2014.01)
    *H04N 19/179*     (2014.01)
    *H04N 19/50*      (2014.01)
    *H04N 5/91*       (2006.01)
    *H04N 9/804*      (2006.01)
    *G11B 20/10*      (2006.01)
    *H04N 19/137*     (2014.01)

(52) U.S. Cl.
    CPC ......... *H04N 19/154* (2014.11); *H04N 19/179* (2014.11); *H04N 19/50* (2014.11); *G11B 2020/10537* (2013.01); *H04N 5/91* (2013.01); *H04N 9/8042* (2013.01); *H04N 19/137* (2014.11)

(58) Field of Classification Search
    USPC ..................................... 375/240.02
    See application file for complete search history.

(56) References Cited

U.S. PATENT DOCUMENTS

2008/0101473 A1\* 5/2008 Tanaka ................. H04N 19/56
                                                            375/240.16
2009/0103898 A1\* 4/2009 Morioka .............. G11B 27/034
                                                            386/248

FOREIGN PATENT DOCUMENTS

| JP | 2002-252859 A | 9/2002 |
| JP | 2005-303773 A | 10/2005 |
| JP | 2006-262311 A | 9/2006 |
| WO | WO 01/15459 A1 | 3/2001 |

OTHER PUBLICATIONS

Brasnett et al., "MPEG-7 Technology Image Signature: Image Identification Technology" Mitsubishi Electric Technical Report, Dec. 2008.

Kadyrov et al., "The Trace Transform and Its Applications", IEEE Transactions on Pattern Analysis and Machine Intelligence, vol. 23, No. 28, pp. 811-828, Aug. 2001.

\* cited by examiner

Master Stream and Slave Stream Are Repeated Alternately

Example in which Length of Master Streams Differs
from that of Slave Streams

Example of Sequence Including Scene Change

Stream Immediately after Scene Change
Is Master Stream

Control Using Flag(e.g., 0 Shows Master Stream and 1 Shows Slave Stream)

Skip Partial Scene, Such as Commercial,
and Set Up Master Stream and Slave Stream Example of Conversion of Only I Pictures Example of Conversion of Only I and P Pictures

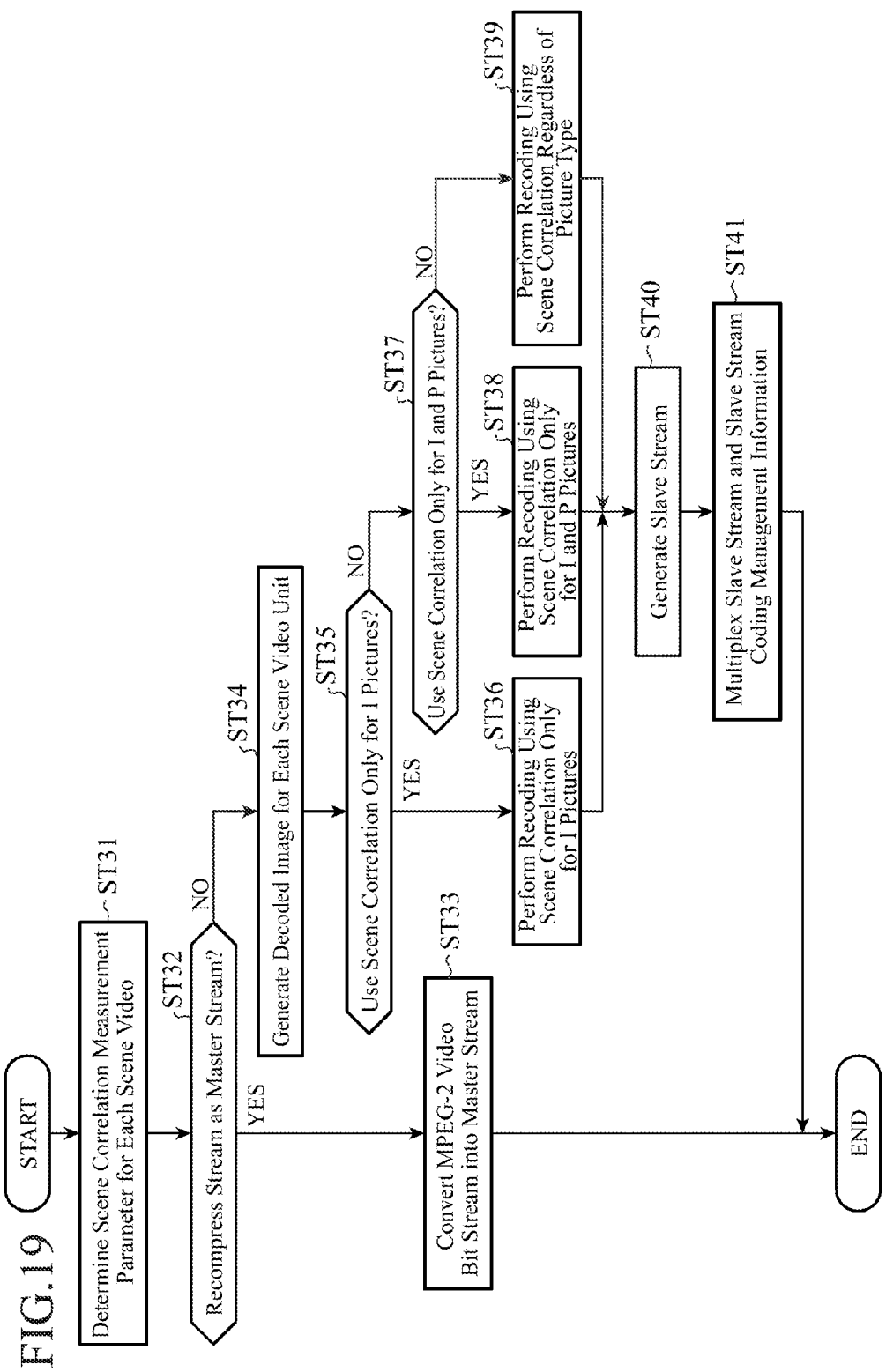

IMAGE CODING DEVICE, IMAGE DECODING DEVICE, IMAGE CODING METHOD, AND IMAGE DECODING METHOD

FIELD OF THE INVENTION

The present invention relates to an image coding device for and an image coding method of compression-coding an image and transmitting or recording coded data, and an image decoding device for and an image decoding method of decoding the coded data transmitted or recorded by the image coding device into an image.

BACKGROUND OF THE INVENTION

A conventional image coding device is constructed in such a way as to, when compression-coding a certain picture sequence, carry out prediction coding using a spatial correlation or a temporal correlation in the picture sequence, thereby improve the compression efficiency. On the other hand, because a large number of video streams compressed are managed in recording space having a huge size in a digital recording device with a built-in HDD, a cloud type system, and so on which have been provided in recent years, the frequency of occurrence of a state in which different picture sequences have similar video contents increases depending upon conditions.

Under such a state, further data compression can be carried out by also utilizing a correlation which exists between different picture sequences. The following patent reference 1 discloses a technology of recording a plurality of recorded programs with a high degree of compression efficiency by making a comparison among several different recorded programs in a digital recording device with a built-in HDD, and compression-coding difference information acquired on the basis of the results of the comparison.

RELATED ART DOCUMENT

Patent Reference
Patent reference 1: Japanese Unexamined Patent Application Publication No. 2006-262311 (paragraph number [0006])

SUMMARY OF THE INVENTION

Problems to be Solved by the Invention

Because the conventional image coding device is constructed as above, the conventional image coding device always calculates, as a measure for comparative evaluation, a difference between the signals of frames at the same time of different video streams, and then compression-codes the differential signal. Therefore, a problem is that efficient compression cannot be carried out when, for example, there is a difference between the times of cuts similar between the videos. A further problem is that because a comparison is made on an image signal level throughout the entire of each of the video streams, the amount of information processed increases.

The present invention is made in order to solve the above-mentioned problems, and it is therefore an object of the present invention to provide an image coding device and an image coding method capable of carrying out efficient compression without causing any increase in the amount of information processed and degradation in the video quality.

It is a further object of the present invention to provide an image decoding device and an image decoding method capable of decoding an image compressed efficiently.

Means for Solving the Problem

In accordance with the present invention, there is provided an image coding device including a video coded data converter that converts each scene video data in video coded data compliant with a first video coding method into video coded data compliant with a second video coding method by selectively applying a prediction reference using other scene video data to each scene video data, in which when converting coded data about each scene video unit in first video coded data, the video coded data converter retrieves coded data about another scene video unit which is to be used for prediction reference, determines whether or not to use the coded data about the scene video unit which the video coded data converter has retrieved for the prediction reference, and converts the coded data about the first scene video unit into video coded data compliant with the second video coding method, and also generates metadata showing whether or not the coded data about the scene video unit which the video coded data converter has retrieved is used for the prediction reference.

Advantages of the Invention

Because the image coding device in accordance with the present invention is constructed in such a way as that the image coding device includes the video coded data converter that converts each scene video data in video coded data compliant with a first video coding method into video coded data compliant with a second video coding method by selectively applying a prediction reference using other scene video data to each scene video data, and, when converting coded data about each scene video unit in first video coded data, the video coded data converter retrieves coded data about another scene video unit which is to be used for prediction reference, determines whether or not to use the coded data about the scene video unit which the video coded data converter has retrieved for the prediction reference, and converts the coded data about the first scene video unit into video coded data compliant with the second video coding method, and also generates metadata showing whether or not the coded data about the scene video unit which the video coded data converter has retrieved is used for the prediction reference, there is provided an advantage of being able to carry out efficient compression without causing any increase in the amount of information processed and degradation in the video quality.

BRIEF DESCRIPTION OF THE FIGURES

FIG. 19 is a flow chart showing processing carried out by an image coding device in accordance with Embodiment 4 of the present invention.

EMBODIMENTS OF THE INVENTION

Hereafter, in order to explain this invention in greater detail, the preferred embodiments of the present invention will be described with reference to the accompanying drawings.

Embodiment 1

In this Embodiment 1, an image coding device that carries out recompression efficiently while preventing degradation in the quality and an image decoding device that plays back a video signal on the basis of coded data outputted from the image coding device in equipment or a system that receives an MPEG-2 video bit stream, carries out recompression on the MPEG-2 video bit stream, and records this MPEG-2 video bit stream recompressed thereby will be explained.

Figure 1:
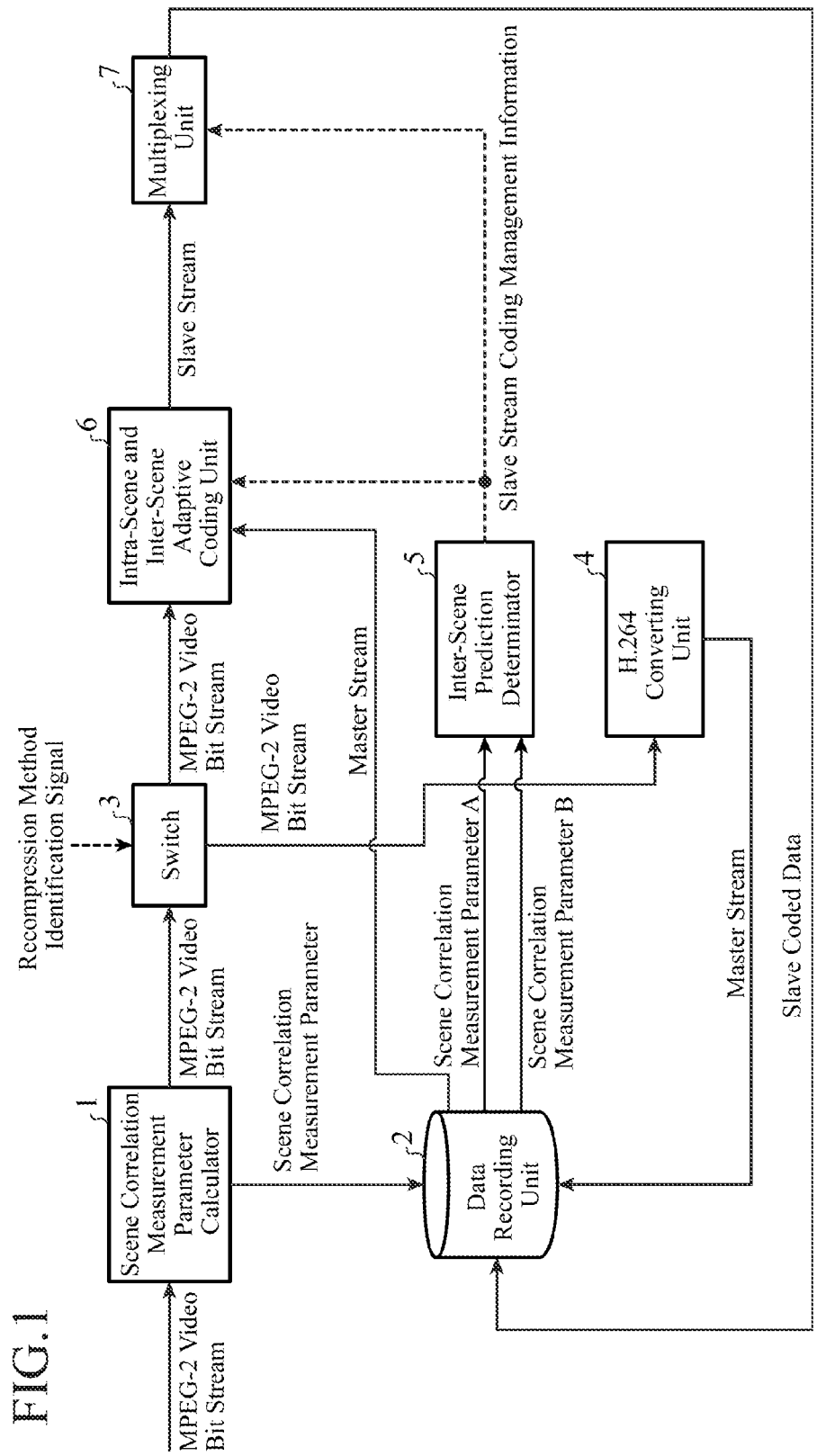
FIG. 1 is a block diagram showing an image coding device in accordance with Embodiment 1 of the present invention.

FIG. 1 is a block diagram showing an image coding device in accordance with Embodiment 1 of the present invention. Referring to FIG. 1, a scene correlation measurement parameter calculating unit 1 is constructed of, for example, a semiconductor integrated circuit equipped with a CPU, or a one chip microcomputer, and carries out a process of, when receiving an MPEG-2 video bit stream (first video coded data) compression-coded by using an MPEG-2 video coding method, determining a scene correlation measurement parameter which serves as a measure for measuring a correlation between the video of each scene (referred to as a "scene video" from here on) and another scene video, the video being included in the MPEG-2 video bit stream. In this embodiment, each scene can be a unit having a predetermined time interval, or a GOP (Group Of Picture) defining the data structure of the MPEG-2 video bit stream, i.e., a data unit (each of all pictured data included between two I pictures) in units of which a random access can be carried out on the MPEG-2 video bit stream. The scene correlation measurement parameter calculating unit 1 constructs a scene correlation measurement parameter calculator.

A data recording unit 2 is constructed of a recording medium, such as a hard disk or an SSD, and records the scene correlation measurement parameter determined by the scene correlation measurement parameter calculating unit 1. The data recording unit 2 also records a master stream (second video coded data) converted by an H.264 converting unit 4 which will be mentioned below, and further records slave coded data or the like which is outputted from a multiplexing unit 7 which will be mentioned below. Although the details of the slave coded data will be mentioned below, the slave coded data consists of coded data (intra-scene prediction coded data) about a scene video unit, which is included in a slave stream (third video coded data) converted by an intra-scene and inter-scene adaptive coding unit 6, which is converted without using coded data retrieved by an inter-scene prediction determining unit 5, and slave stream coding management information showing the coded data retrieved by the inter-scene prediction determining unit 5, and so on. The data recording unit constructs a data recorder 2.

A switch 3 carries out a process of, when a recompression method identification signal provided from outside the image coding device shows "recompress an MPEG-2 video bit stream as a master stream", providing the MPEG-2 video bit stream outputted thereto from the scene correlation measurement parameter calculating unit 1 to the H.264 converting unit 4, and, when the recompression method identification signal shows "recompress an MPEG-2 video bit stream as a slave stream", providing the MPEG-2 video bit stream outputted thereto from the scene correlation measurement parameter calculating unit 1 to the intra-scene and inter-scene adaptive coding unit 6.

The H.264 converting unit 4 is constructed of, for example, a semiconductor integrated circuit equipped with a CPU, or a one chip microcomputer, and carries out a process of, when an MPEG-2 video bit stream is provided thereto from the switch 3, converting the MPEG-2 video bit stream into a video bit stream compliant with an H.264 video coding method according to a predetermined processing procedure, and recording the video bit stream in the data recording unit 2 as a master stream. The H.264 converting unit 4 constructs a first video coded data converter.

The inter-scene prediction determining unit 5 is constructed of, for example, a semiconductor integrated circuit equipped with a CPU, or a one chip microcomputer, and carries out a process of, when the intra-scene and inter-scene adaptive coding unit 6 carries out prediction coding, retrieving coded data which is to be used for prediction reference, instead of the coded data about each scene video unit in the MPEG-2 video bit stream, from the coded data about scene video units in the master stream recorded in the data recording unit 2 on the basis of the scene correlation measurement parameter (a correlation measurement parameter A or a correlation measurement parameter B) which is determined by the scene correlation measurement parameter calculating unit 1. The inter-scene prediction determining unit 5 constructs a coded data retrieving unit. The scene correlation measurement parameter A is determined when the recompression method identification signal shows "recompress an MPEG-2 video bit stream as a master stream", and the scene correlation measurement parameter B is determined when the recompression method identification signal shows "recompress an MPEG-2 video bit stream as a slave stream."

More specifically, the inter-scene prediction determining unit 5 carries out a process of measuring a correlation between each scene video in an MPEG-2 video bit stream and each scene video in a master stream recorded in the data recording unit 2 by using the scene correlation measurement parameter A or B determined by the scene correlation measurement parameter calculating unit 1, and also specifying a scene video having the highest correlation value in the master stream for each scene video in the MPEG-2 video bit stream, and, when the correlation value is equal to or larger than a predetermined value, determining the coded data about the scene video as the coded data to be used for the prediction reference. The inter-scene prediction determining unit 5 further carries out a process of, when finding out coded data to be used for the prediction reference (when a scene video having a high correlation exists), outputting slave stream coding management information showing "carry out coding for the scene which is the target for processing by using the coded data about high-correlation scene video in the master stream" to the intra-scene and inter-scene adaptive coding unit 6 and the multiplexing unit 7, and, when not finding out coded data to be used for the prediction reference (when no coded data about a scene video having a high correlation exists), outputting slave stream coding management information showing "carry out coding in closed loop within the scene on the scene which is the target for processing without using any coded data in the master stream" to the intra-scene and inter-scene adaptive coding unit 6 and the multiplexing unit 7.

The slave stream coding management information includes at least a master stream ID for identifying the master stream from among a plurality of bitstream data recorded in the data recording unit 2, an inter-scene prediction specification flag for specifying whether or not to use coded data about a scene video unit in the master stream for the prediction reference, and a master scene ID for identifying a master scene (scene to be used for the prediction reference) in the master stream.

The intra-scene and inter-scene adaptive coding unit 6 is constructed of, for example, a semiconductor integrated circuit equipped with a CPU, or a one chip microcomputer, and carries out a process of converting the MPEG-2 video bit stream into a slave stream by using both coded data which is included in the coded data about scene video units in the master stream recorded in the data recording unit 2 and for which alternative coded data to be used for the prediction reference has not been retrieved by the inter-scene prediction determining unit 5, and the coded data retrieved by the inter-scene prediction determining unit 5 for the prediction reference. The intra-scene and inter-scene adaptive coding unit 6 constructs a second video coded data converter.

The multiplexing unit 7 is constructed of, for example, a semiconductor integrated circuit equipped with a CPU, or a one chip microcomputer, and carries out a process of multiplexing the slave stream converted by the intra-scene and inter-scene adaptive coding unit 6 and the slave stream coding management information outputted from the inter-scene prediction determining unit 5, and records the result of the multiplexing in the data recording unit 2 as slave coded data.

Figure 2:
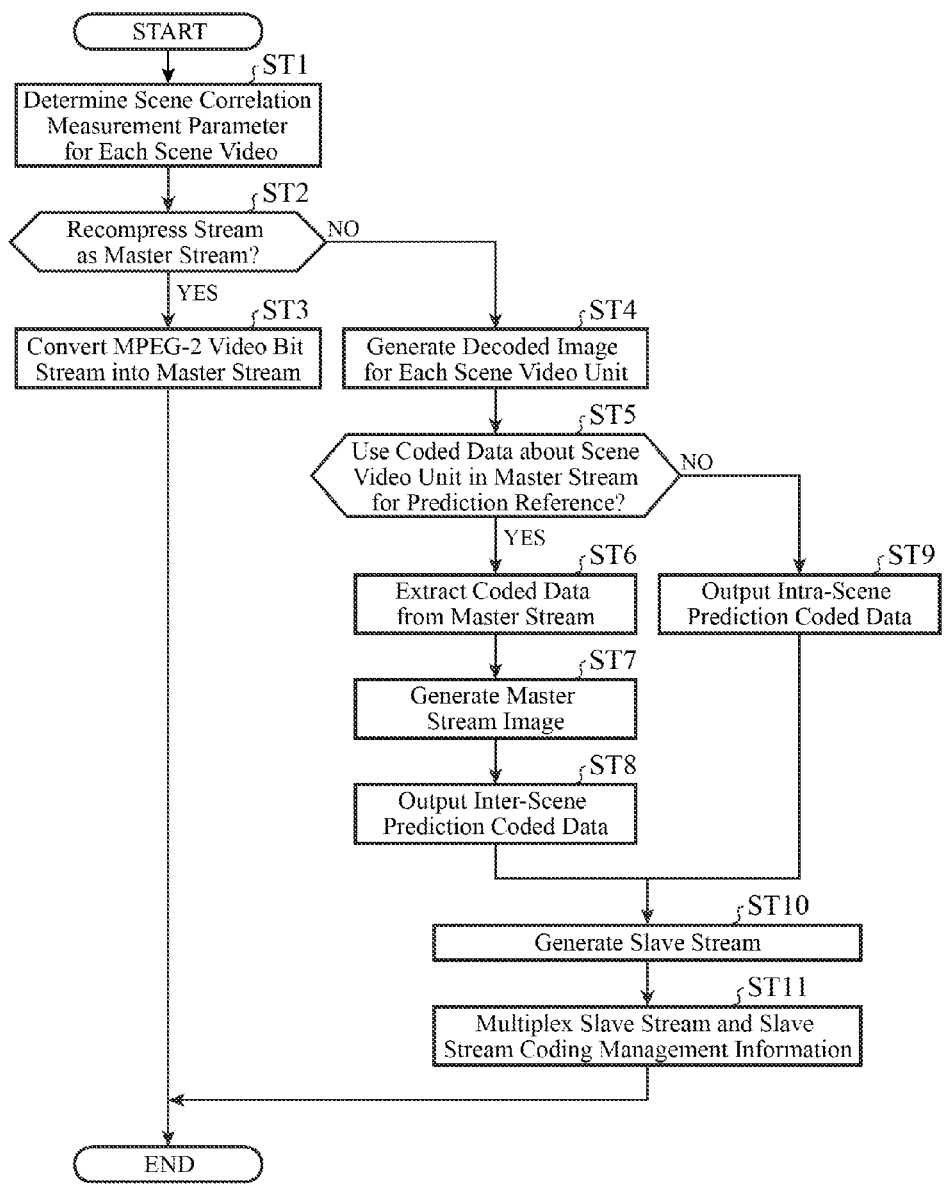
FIG. 2 is a flow chart showing processing (image coding method) carried out by the image coding device in accordance with Embodiment 1 of the present invention.

In the example shown in FIG. 1, it is assumed that each of the components of the image coding device including the scene correlation measurement parameter calculating unit 1, the data recording unit 2, the switch 3, the H.264 converting unit 4, the inter-scene prediction determining unit 5, the intra-scene and inter-scene adaptive coding unit 6, and the multiplexing unit 7 is constructed of hardware for exclusive use. As an alternative, the image coding device can be constructed of a computer. In the case in which the image coding device is constructed of a computer, the data recording unit 2 should just be constructed on a memory of the computer, a program in which the processes carried out by the scene correlation measurement parameter calculating unit 1, the switch 3, the H.264 converting unit 4, the inter-scene prediction determining unit 5, the intra-scene and inter-scene adaptive coding unit 6, and the multiplexing unit 7 are described should just be stored in the memory of the computer, and a CPU of the computer should just be made to execute the program stored in the memory. FIG. 2 is a flow chart showing the processing (image coding method) carried out by the image coding device in accordance with Embodiment 1 of the present invention.

Figure 3:
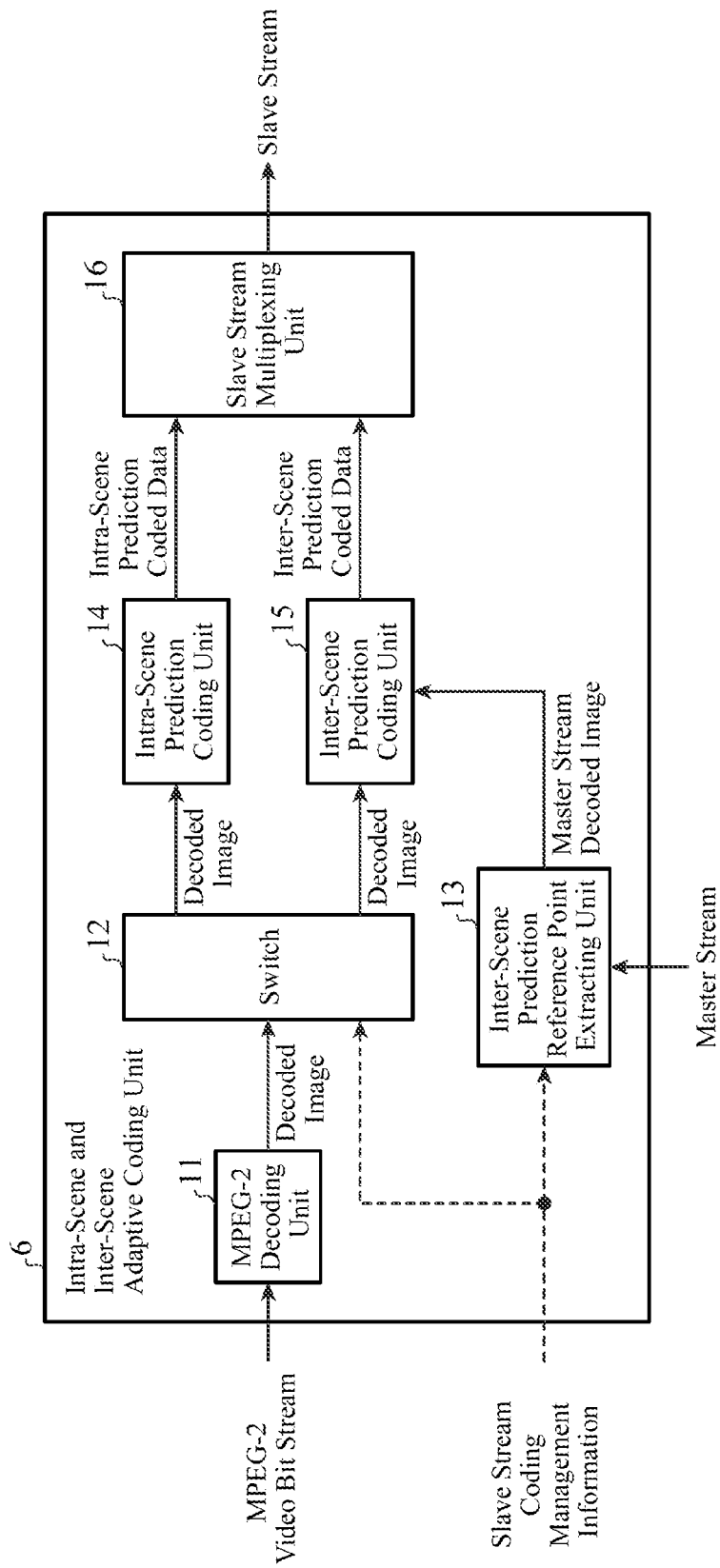
FIG. 3 is a block diagram showing an intra-scene and inter-scene adaptive coding unit 6 of the image coding device in accordance with Embodiment 1 of the present invention.

FIG. 3 is a block diagram showing the intra-scene and inter-scene adaptive coding unit 6 of the image coding device in accordance with Embodiment 1 of the present invention. Referring to FIG. 3, when an MPEG-2 video bit stream is provided from the switch 3 to an MPEG-2 decoding unit 11, the MPEG-2 decoding unit 11 carries out a process of performing a decoding process on the coded data about each scene video in the MPEG-2 video bit stream to generate a decoded image on a per scene video basis. A switch 12 carries out a process of, when the inter-scene prediction specification flag included in the slave stream coding management information outputted from the inter-scene prediction determining unit 5 shows that the coded data about a scene video unit in the master stream is not used for the prediction reference, outputting the decoded image generated by the MPEG-2 decoding unit 11 to an intra-scene prediction coding unit 14, and, when the inter-scene prediction specification flag shows that the coded data about a scene video unit in the master stream is used for the prediction reference, outputting the decoded image generated by the MPEG-2 decoding unit 11 to an inter-scene prediction coding unit 15.

An inter-scene prediction reference point extracting unit 13 carries out a process of, when the inter-scene prediction specification flag included in the slave stream coding management information outputted from the inter-scene prediction determining unit 5 shows that the coded data about a scene video unit in the master stream is used for the prediction reference, extracting the coded data about the scene video indicated by each master scene ID from the master stream indicated by the master stream ID included in the slave stream coding management information and performing an H.264 decoding process on the coded data to generate a decoded image of the scene video (referred to as a "master stream decoded image" from here on).

The intra-scene prediction coding unit 14 carries out a process of performing an H.264 compression coding process on the decoded image outputted from the switch 12 without using any coded data in the master stream, and outputting an intra-scene prediction coded data which is the result of the coding process. The inter-scene prediction coding unit 15 carries out a process of performing an H.264 motion compensation process or a compression coding process using an intra prediction by using a time correlation of the decoded image outputted from the switch 12 and a correlation between the decoded image and image data about an image at the same time position in the master stream decoded image generated by the inter-scene prediction reference point extracting unit 13, and outputting inter-scene prediction coded data which is the result of the process.

A slave stream multiplexing unit 16 carries out a process of multiplexing the intra-scene prediction coded data outputted from the intra-scene prediction coding unit 14 and the inter-scene prediction coded data outputted from the inter-scene prediction coding unit 15 to generate a slave stream, and outputting the slave stream to the multiplexing unit 7.

Figure 4:
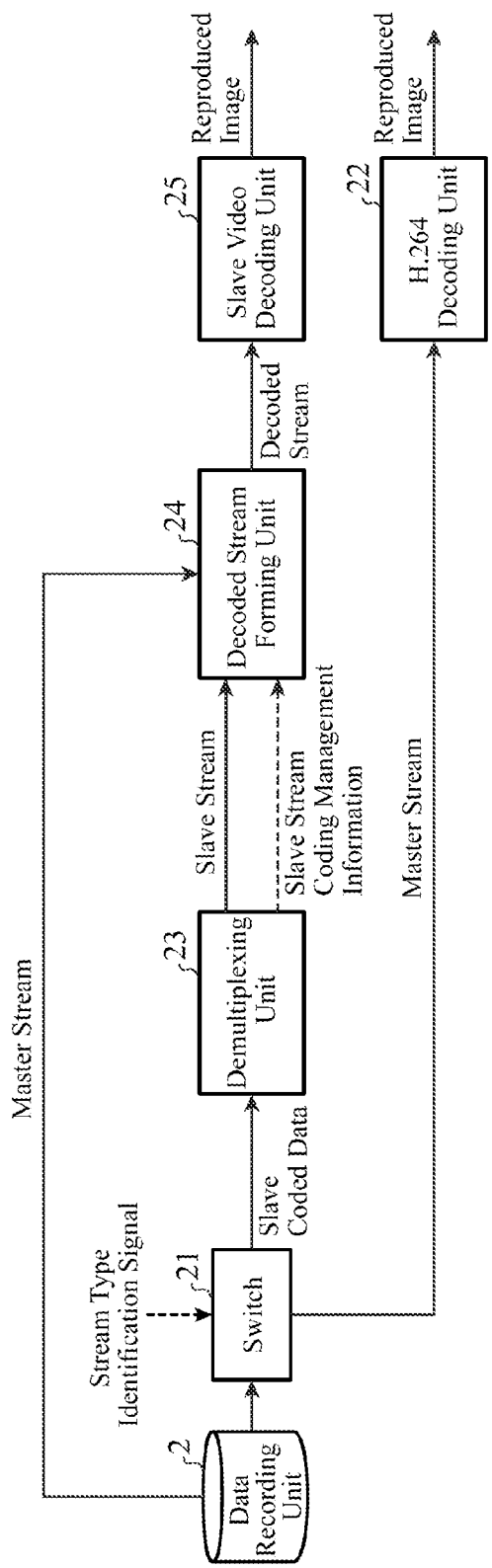
FIG. 4 is a block diagram showing an image decoding device in accordance with Embodiment 1 of the present invention.

FIG. 4 is a block diagram showing the image decoding device in accordance with Embodiment 1 of the present invention. Referring to FIG. 4, a data recording unit 2 is the same as the data recording unit 2 of the image coding device shown in FIG. 1. A switch 21 carries out a process of, when a stream type identification signal provided from outside the image decoding device shows "decode the coded data as a master stream", reading the master stream recorded in the data recording unit 2 and outputting the master stream to an H.264 decoding unit 22, and, when the stream type identification signal shows "decode the coded data as slave coded data", outputting the slave coded data recorded in the data recording unit 2 to a demultiplexing unit 23.

The H.264 decoding unit 22 is constructed of, for example, a semiconductor integrated circuit equipped with a CPU, or a one chip microcomputer, and carries out a process of, when receiving the master stream from the switch 21, performing a predetermined decoding process compliant with an H.264 video coding method on the master stream to generate a reproduced image. The H.264 decoding unit 22 constructs a first video decoder.

The demultiplexing unit 23 is constructed of, for example, a semiconductor integrated circuit equipped with a CPU, or a one chip microcomputer, and carries out a process of, when receiving the slave coded data from the switch 21, demultiplexing the slave coded data into a slave stream and slave stream coding management information. A decoded stream forming unit 24 is constructed of, for example, a semiconductor integrated circuit equipped with a CPU, or a one chip microcomputer, and carries out a process of reading the master stream indicated by the master stream ID included in the slave stream coding management information demultiplexed by the demultiplexing unit 23 from among a plurality of master streams recorded in the data recording unit 2, extracting the coded data about the scene video indicated by each master scene ID included in the slave stream coding management information from the master stream, and embedding the coded data at the position of the corresponding scene video of the slave stream demultiplexed by the demultiplexing unit 23 to form a decoded stream.

A slave video decoding unit 25 is constructed of, for example, a semiconductor integrated circuit equipped with a CPU, or a one chip microcomputer, and carries out a process of performing a predetermined decoding process on the decoded stream formed by the decoded stream forming unit 24 to generate a reproduced image corresponding to the slave coded data. A second video decoder is comprised of the demultiplexing unit 23, the decoded stream forming unit 24, and the slave video decoding unit 25.

Figure 5:
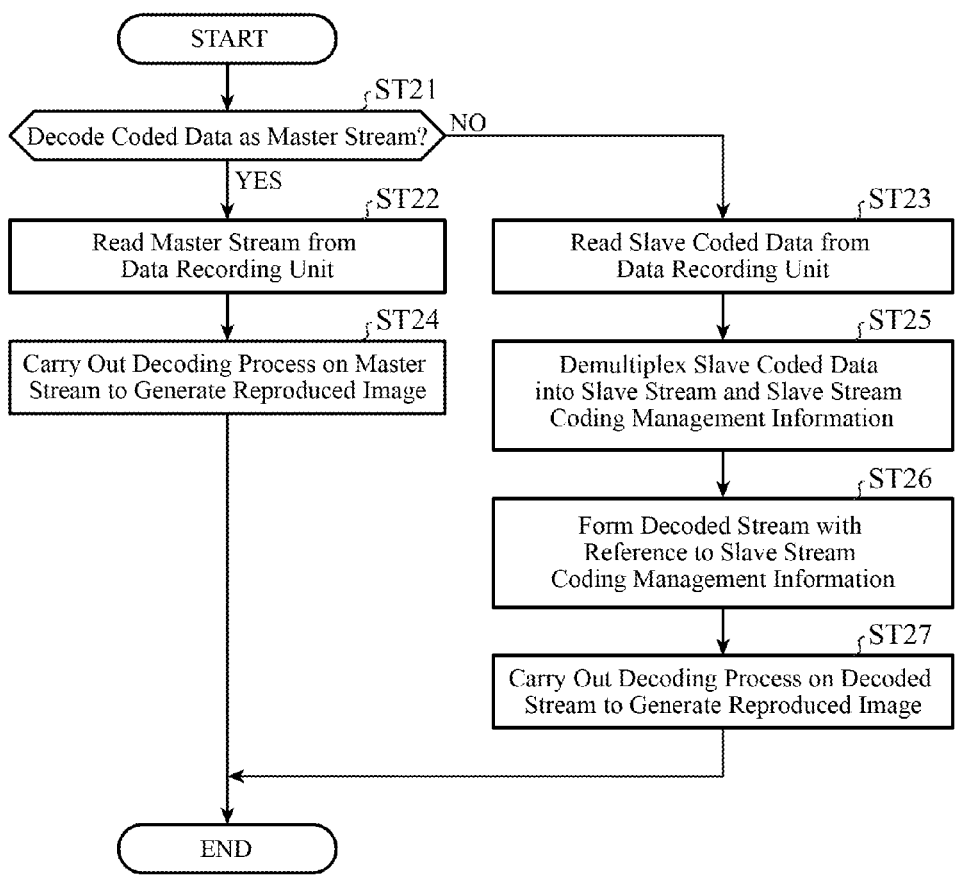
FIG. 5 is a flow chart showing processing (image coding method) carried out by the image decoding device in accordance with Embodiment 1 of the present invention.

In the example shown in FIG. 4, it is assumed that each of the components of the image decoding device including the data recording unit 2, the switch 21, the H.264 decoding unit 22, the demultiplexing unit 23, the decoded stream forming unit 24, and the slave video decoding unit 25 is constructed of hardware for exclusive use. As an alternative, the image decoding device can be constructed of a computer. In the case in which the image decoding device is constructed of a computer, the data recording unit 2 should just be constructed on a memory of the computer, a program in which the processes carried out by the switch 21, the H.264 decoding unit 22, the demultiplexing unit 23, the decoded stream forming unit 24, and the slave video decoding unit 25 are described should just be stored in the memory of the computer, and a CPU of the computer should just be made to execute the program stored in the memory. FIG. 5 is a flow chart showing the processing (image coding method) carried out by the image decoding device in accordance with Embodiment 1 of the present invention.

Next, the operations of the devices will be explained. First, the processing carried out by the image coding device shown in FIG. 1 will be explained. When receiving an MPEG-2 video bit stream compression-coded by using an MPEG-2 video coding method, the scene correlation measurement parameter calculating unit 1 determines a scene correlation measurement parameter which serves as a measure for measuring a correlation between each scene video of the MPEG-2 video bit stream and another scene video (step ST1 of FIG. 2). In this embodiment, each scene can be a unit having a predetermined time interval, or a GOP (Group Of Picture) defining the data structure of the MPEG-2 video bit stream, i.e., a data unit (each of all pictured data included between two I pictures) in units of which a random access can be carried out on the MPEG-2 video bit stream. The scene correlation measurement parameter for each scene video which is determined by the scene correlation measurement parameter calculating unit 1 is recorded in the data recording unit 2.

Hereafter, a concrete example of the scene correlation measurement parameter will be described. A quantity making it possible to measure the "degree of similarity between two scenes" is used as the scene correlation measurement parameter. For example, there can be provided a method of forming a reduced image from the DC components of DCT coefficients included in I picture coded data of the MPEG-2 video bit stream, generating a quantity showing textural features including the average luminance and the variance of luminance of the reduced image or color features including the average color or the variance of color of the reduced image, and using the quantity showing the textural features or the color features as the scene correlation measurement parameter. As an alternative, there can be provided a method of generating an "Image Signature", as disclosed by the following nonpatent reference 1, for the reduced image formed of the DC components, and using the "Image Signature" as the scene correlation measurement parameter.

[Nonpatent Reference 1]

Nishikawa, P. Brasnett, et al., "MPEG-7 technology Image Signature: image identification technology", Mitsubishi Electric Technical Report, December 2008

"Image Signature" is a quantity which expresses luminance information with a spatial frequency using a trace transform disclosed by the following nonpatent reference 2, and is internationally standardized as a parameter for evaluating the identity of an image. Concretely, there can be provided a method of using the "Image Signature" of the head of the scene or a set of "Image Signatures" corresponding to reduced images of a plurality of I pictures included in the scene as the scene correlation measurement parameter.
[Nonpatent Reference 2]
A. Kadyrov, M. Petrou, "The Trace Transform and Its Applications", IEEE Trans. Pattern Analysis and Machine Intelligence, vol. 23 no. 8 pp. 811-828 2001

As an alternative, there can be a method of generating a "Video Signature", as disclosed by the following nonpatent reference 3, and using the "Video Signature" as the scene correlation measurement parameter.
[Nonpatent Reference 3]
Kudo and Nishikawa, "Image Identification Technology (Visual Signature)", Mitsubishi Electric Technical Report, November 2011

In any one of the above-mentioned references, a reduced image is generated from the DC components of DCT coefficients included in I picture coded data of the MPEG-2 video bit stream, and a feature quantity for the reduced image is defined as the scene correlation measurement parameter. As an alternative, the MPEG-2 video bit stream can be decoded to image data, and a similar feature quantity on a decoded image level can be extracted from the image data. As a result, although the amount of information processed is increased, a feature quantity based on actual image data can be extracted.

When the recompression method identification signal provided from outside the image coding device shows "recompress an MPEG-2 video bit stream as a master stream" (step ST2), the switch 3 provides the MPEG-2 video bit stream outputted thereto from the scene correlation measurement parameter calculating unit 1 to the H.264 converting unit 4. In contrast, when the recompression method identification signal shows "recompress an MPEG-2 video bit stream as a slave stream" (step ST2), the switch provides the MPEG-2 video bit stream outputted thereto from the scene correlation measurement parameter calculating unit 1 to the intra-scene and inter-scene adaptive coding unit 6.

When the MPEG-2 video bit stream is provided thereto from the switch 3, the H.264 converting unit 4 converts the MPEG-2 video bit stream into a video bit stream compliant with an H.264 video coding method according to the predetermined processing procedure, and records the video bit stream in the data recording unit 2 as a master stream (step ST3).

When the scene correlation measurement parameter calculating unit 1 determines the scene correlation measurement parameter A or the scene correlation measurement parameter B, the inter-scene prediction determining unit 5 retrieves coded data which is to be used for the prediction reference, instead of the coded data about each scene video unit in the MPEG-2 video bit stream, from the coded data about scene video units in the master stream recorded in the data recording unit 2 on the basis of the scene correlation measurement parameter A or B. The scene correlation measurement parameter A is determined when the recompression method identification signal shows "recompress an MPEG-2 video bit stream as a master stream", and the scene correlation measurement parameter B is determined when the recompression method identification signal shows "recompress an MPEG-2 video bit stream as a slave stream." Hereafter, the retrieving process of retrieving coded data which is carried out by the inter-scene prediction determining unit 5 will be explained concretely.

First, the inter-scene prediction determining unit 5 measures a correlation between each scene video in the MPEG-2 video bit stream and each scene video in the master stream recorded in the data recording unit 2 by using the scene correlation measurement parameter A or B determined by the scene correlation measurement parameter calculating unit 1. Next, as to each scene video in the MPEG-2 video bit stream, the inter-scene prediction determining unit 5 makes a comparison among correlations between the above-mentioned scene video and each scene video in the master stream, and retrieves a scene video having the largest correlation value in the master stream. After retrieving a scene video having the largest correlation value in the master stream, the inter-scene prediction determining unit 5 decides the coded data about the scene video as the scene video to be used for the prediction reference when the correlation value is equal to or larger than a predetermined value which is set in advance. In contrast, when the correlation value is smaller than the predetermined value which is set in advance, the inter-scene prediction determining unit does not use the coded data about any scene video in the master stream for the prediction reference.

The process of retrieving a scene video having the largest correlation value in the master stream, which is carried out by the inter-scene prediction determining unit 5, corresponds to a matching process of making matching between the scene correlation measurement parameter A and the scene correlation measurement parameter B. For example, the matching process disclosed by the above-mentioned nonpatent reference 3, such as "Image Signature" or "Video Signature", can be used.

When coded data which the intra-scene and inter-scene adaptive coding unit 6 uses for the prediction reference is found (when there exists a scene video having a high correlation with a scene video in the MPEG-2 video bit stream in the master stream), the inter-scene prediction determining unit 5 outputs slave stream coding management information showing "carry out coding on the scene which is the target for processing by using the coded data about a scene video having a high correlation in the master stream" to the intra-scene and inter-scene adaptive coding unit 6 and the multiplexing unit 7. In contrast, when coded data which the intra-scene and inter-scene adaptive coding unit 6 uses for the prediction reference is not found (when there does not exist a scene video having a high correlation with a scene video in the MPEG-2 video bit stream in the master stream), the inter-scene prediction determining unit 5 outputs slave stream coding management information showing "carry out coding in closed loop within the scene on the scene which is the target for processing without using any coded data in the master stream" to the intra-scene and inter-scene adaptive coding unit 6 and the multiplexing unit 7.

The slave stream coding management information includes at least the master stream ID for identifying the master stream from among the plurality of bitstream data recorded in the data recording unit 2, the inter-scene prediction specification flag for specifying whether or not to use the coded data about a scene video unit in the master stream for the prediction reference, and a master scene ID for identifying a master scene (scene to be used for the prediction reference) in the master stream.

Because the scene correlation measurement parameter B becomes unnecessary after the slave stream coding management information is outputted from the inter-scene prediction determining unit 5, the scene correlation measurement parameter B can be erased from the data recording unit 2. Because the scene correlation measurement parameter A is required in the future when another slave stream is generated, the scene correlation measurement parameter A can be stored in the data recording unit 2. As an alternative, in order to ensure the storage capacity of the data recording unit 2, the scene correlation measurement parameter A can be generated from the master stream on an as needed basis every time when a slave stream is generated. Because the scene correlation measurement parameter A also becomes unnecessary in a case of not using the master stream when a slave stream is generated, the scene correlation measurement parameter A can be erased from the data recording unit 2.

The intra-scene and inter-scene adaptive coding unit 6 converts the MPEG-2 video bit stream into a slave stream by using both coded data which is included in the coded data about scene video units in the master stream recorded in the data recording unit 2 and for which alternative coded data to be used for the prediction reference has not been retrieved by the inter-scene prediction determining unit 5, and the coded data retrieved by the inter-scene prediction determining unit 5 for the prediction reference.

Figure 6:
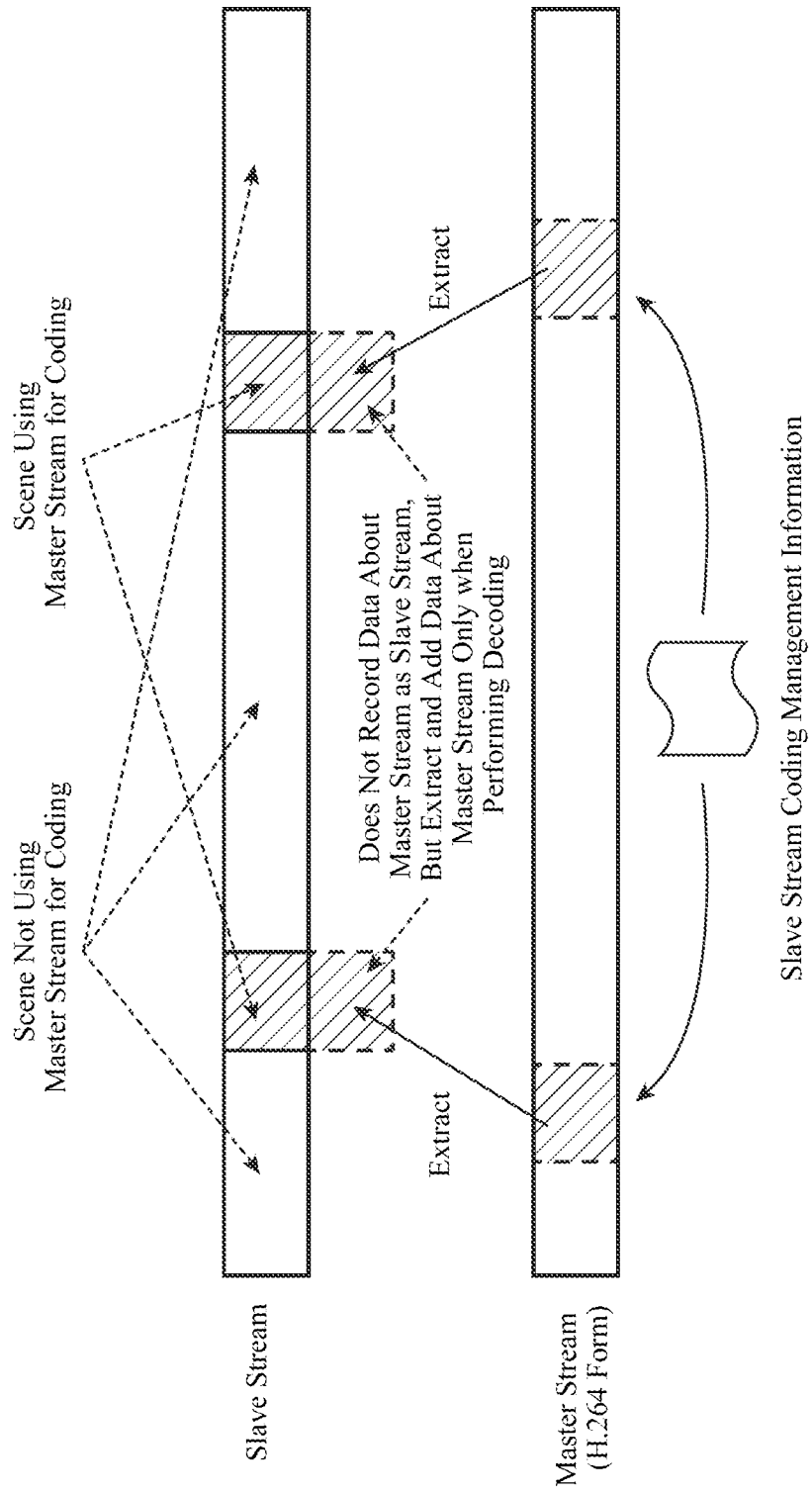
FIG. 6 is an explanatory drawing showing a relationship between slave coded data and a master stream.

FIG. 6 is an explanatory drawing showing a relationship between slave coded data and a master stream. The master stream shown in FIG. 6 is the one which is included in the one or more master streams recorded into the data recording unit 2 and which is indicated by the master stream ID included in the slave stream coding management information, and is generated by using an H.264 video coding method. The slave stream is categorized into coded data about a scene video unit in the master stream or coded data for which coded data about a scene video unit in the master stream is not used instead according to the inter-scene prediction specification flag included in the slave stream coding management information. Further, a master scene (scene to be used for the prediction reference) on the master stream is specified by each master scene ID included in the slave stream coding management information.

Hereafter, the conversion process of converting the stream which is carried out by the intra-scene and inter-scene adaptive coding unit 6 will be explained concretely. First, when an MPEG-2 video bit stream is provided thereto from the switch 3, the MPEG-2 decoding unit 11 of the intra-scene and inter-scene adaptive coding unit 6 performs a decoding process on the coded data about each scene video in the MPEG-2 video bit stream to generate a decoded image about each scene video unit (step ST4).

When the inter-scene prediction specification flag included in the slave stream coding management information outputted from the inter-scene prediction determining unit 5 shows that the coded data about a scene video unit in the master stream is not used for the prediction reference (step ST5), the switch 12 outputs the decoded image generated by the MPEG-2 decoding unit 11 to the intra-scene prediction coding unit 14. When the inter-scene prediction specification flag shows that the coded data about a scene video unit in the master stream is used for the prediction reference (step ST5), the switch outputs the decoded image generated by the MPEG-2 decoding unit 11 to the inter-scene prediction coding unit 15.

When the inter-scene prediction specification flag included in the slave stream coding management information outputted from the inter-scene prediction determining unit 5 shows that the coded data about a scene video unit in the master stream is used for the prediction reference (step ST5), the inter-scene prediction reference point extracting unit 13 extracts the coded data about the scene video indicated by each master scene ID from the master stream indicated by the master stream ID included in the slave stream coding management information (step ST6). After extracting the coded data about the scene video indicated by each master scene ID, the inter-scene prediction reference point extracting unit 13 carries out an H.264 decoding process on the coded data to generate a master stream decoded image which is the decoded image of the scene video (step ST7).

In this case, the coded data about the scene video extracted from the master stream can be constructed to have an IDR picture as the picture at the head of the scene and be accessed randomly. As an alternative, the coded data about the scene video extracted from the master stream can be constructed not to have an IDR picture as the picture at the head of the scene. In the former case, although there is provided an advantage of facilitating the extracting process, there is a trade-off between this advantage and a limitation imposed on the compression efficiency of the master stream itself because an IDR picture is inserted frequently. In the latter case, although the compression efficiency of the master stream itself can be maintained conversely because it is not affected by the influence of the insertion of IDR pictures, there is a trade-off between this advantage and a disadvantage of the extracting process becoming complicated, such as a necessity to extract and decode coded data from an IDR picture position where the picture at the head of the scene can be decoded normally and which is the closest in time. Either of these data structures can be formed on the basis of the actual requirements for the device.

Figure 7:
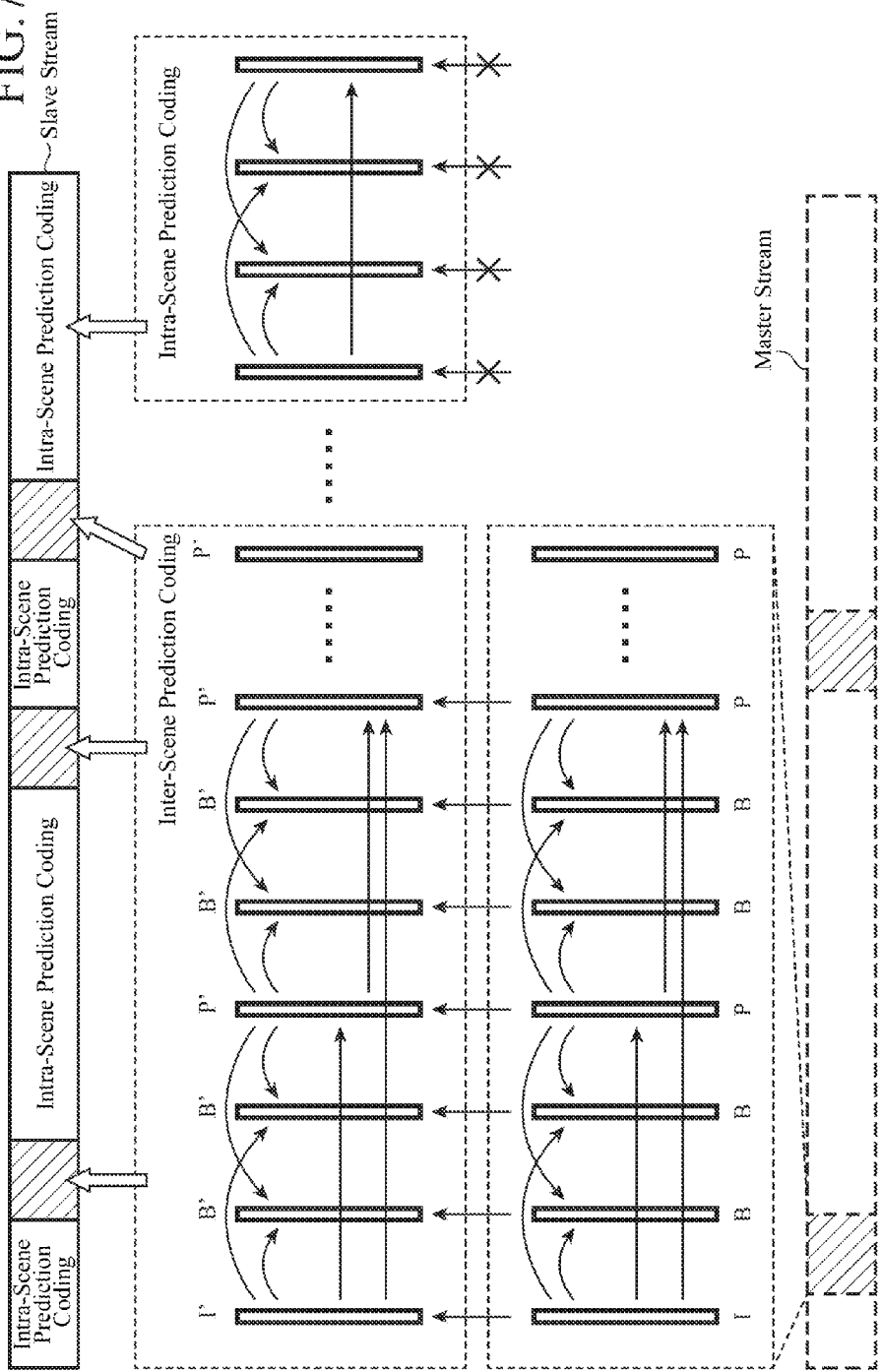
FIG. 7 is an explanatory drawing showing processes carried out by an intra-scene prediction coding unit 14 and an inter-scene prediction coding unit 15 in the intra-scene and inter-scene adaptive coding unit 6.

FIG. 7 is an explanatory drawing showing the processes carried out by the intra-scene prediction coding unit 14 and the inter-scene prediction coding unit 15 in the intra-scene and inter-scene adaptive coding unit 6. In FIG. 7, each of symbols I, P, and B shows the coding type of a picture included in the coded data about a scene video unit extracted from the master stream, and each of symbols I', P', and B' shows the coding type of a picture on the slave stream corresponding to the time position of the picture shown by each of the symbols I, P, and B. In the example shown in FIG. 7, a structure in which I', P', and B' pictures also make it possible to make an inter-scene prediction reference from a picture corresponding to the same time position in addition to intra-scene prediction coding equivalent to that performed on corresponding I, P, and B pictures on the master stream is shown. This does not mean that the present invention imposes any constraint of performing a prediction coding process always equivalent to that performed on I, P, and B pictures on I', P' and B' pictures.

For example, a coding process equivalent to that performed on a P' picture can be carried out on a B' picture. In accordance with this Embodiment 1, for the sake of simplicity, it is assumed that coded data extracted from a master stream starts from an IDR picture (the I picture shown in FIG. 7 is assumed to be an "IDR picture"), and is coded by using the coded data about a P picture and the coded data about a B picture, and a prediction coding process and an inter-scene prediction coding process equivalent to those performed on I, P, and B pictures are carried out on I', P' and B' pictures of a slave stream.

When receiving the decoded image from the switch 12, the inter-scene prediction coding unit 15 performs an H.264 motion compensation process or a compression coding process using an intra prediction by using the time correlation of the decoded image and the correlation between the decoded image and image data about an image at the same time position in the master stream decoded image generated by the inter-scene prediction reference point extracting unit 13, and outputs inter-scene prediction coded data which is the result of the process (step ST8). When receiving the decoded image from the switch 12, the intra-scene prediction coding unit 14 performs an H.264 compression coding process on the decoded image without using any coded data in the master stream, and outputs an intra-scene prediction coded data which is the result of the coding process (step ST9).

In this case, as to an I' picture, the intra-scene prediction coding unit carries out prediction coding using an inter-scene correlation from an I picture without using the time correlation in the slave video. As a result, there is provided an advantage of improving the coding efficiency while maintaining the random access ability on the slave stream. The inter-scene prediction coding unit can be constructed in such a way to locally select whether or not to use the inter-scene prediction for each predetermined unit to be processed, such as each macroblock or each block which serves as a unit for motion-compensated prediction, and use the inter-scene prediction only for a local part on the image where the prediction efficiency is increased.

By constructing this constraint on the prediction reference and an arrangement of coded data in such a way that the constraint and the arrangement comply with the MVC (multi view coding) specifications defined by the recommendation Annex H of H.264, the arrangement can be constructed as coded data compliant with the MVC standards with the coded data about the master stream extracted by the inter-scene prediction reference point extracting unit 13 being defined as a base view and the slave stream consisting of the intra-scene prediction coded data and the inter-scene prediction coded data being defined as an enhancing view. Because the constraint and the arrangement are constructed in this way, a desired operation can be implemented in order to play back a video signal corresponding to the slave coded data by using, as the slave video decoding unit 25 shown in FIG. 4, an existing decoding device which does not comply with new process specifications at all, but complies with the standard specifications.

The slave stream multiplexing unit 16 multiplexes the intra-scene prediction coded data outputted from the intra-scene prediction coding unit 14 and the inter-scene prediction coded data outputted from the inter-scene prediction coding unit 15 to generate a slave stream, and outputs the slave stream to the multiplexing unit 7 (step ST10). The multiplexing unit 7 multiplexes the slave stream converted by the intra-scene and inter-scene adaptive coding unit 6 and the slave stream coding management information outputted from the inter-scene prediction determining unit 5, and records the result of the multiplexing in the data recording unit 2 as slave coded data (step ST11).

In this case, the multiplexing unit 7 can physically record the slave stream and the slave stream coding management information in the form of a single file, a stream or the like. As an alternative, the multiplexing unit 7 can manage the slave stream coding management information as data in an XML form, for example, and record the slave stream coding management information in such a way that a link between the slave stream coding management information and the slave stream is formed. The slave stream is not formed into a form in which decoding and video playback are carried out independently on the slave stream, and when decoding and video playback are carried out on the slave stream, the coded data about the master stream are extracted and added adaptively for each scene video. Because the master stream is recorded in the data recording unit 2, what is necessary is just to carry out the extracting and adding process on the coded data about the master stream on an as needed basis when the video corresponding to the slave stream is decoded and played back. As a result, because the scene video used to code the master stream can be constructed in such a way as not to fully include the coded data about the master stream which is actually needed for the decoding as recorded data, the amount of data which should be recorded as the slave stream can be reduced without quality degradation, and the storage capacity of the data recording unit 2 can be used efficiently.

Next, the processing carried out by the image decoding device shown in FIG. 4 will be explained. First, the switch 21 selects a procedure for carrying the decoding process of decoding the coded data recorded in the data recording unit 2 according to the stream type identification signal provided thereto from outside the image decoding device. More specifically, when the stream type identification signal provided thereto from outside the image decoding device shows "decode the coded data as a master stream" (step ST21 in FIG. 5), the switch 21 reads the master stream recorded in the data recording unit 2 and outputs the master stream to the H.264 decoding unit 22 (step ST22). In contrast, when the stream type identification signal shows "decode the coded data as slave coded data" (step ST21), the switch 21 reads the slave coded data recorded in the data recording unit 2 and outputs the slave coded data to the demultiplexing unit 23 (step ST23).

When receiving the master stream from the switch 21, the H.264 decoding unit 22 carries out the predetermined decoding process compliant with an H.264 video coding method on the master stream to generate a reproduced image (step ST24).

When receiving the slave coded data from the switch 21, the demultiplexing unit 23 demultiplexes the slave coded data into the slave stream and the slave stream coding management information, and outputs the slave stream and the slave stream coding management information to the decoded stream forming unit 24 (step ST25).

When receiving the slave stream and the slave stream coding management information from the demultiplexing unit 23, the decoded stream forming unit 24 reads the master stream indicated by the master stream ID included in the slave stream coding management information from among the plurality of master streams recorded in the data recording unit 2. The decoded stream forming unit 24 also extracts the coded data about the scene video indicated by each master scene ID included in the slave stream coding management information from the master stream read thereby. The decoded stream forming unit extracts the coded data about scene videos which are hatched portions in the master stream of FIG. 6.

After extracting the coded data of the scene video indicated by each master scene ID, the decoded stream forming unit 24 specifies the scene video corresponding to the scene video indicated by the master scene ID from among the scene videos in the slave stream demultiplexed by the demultiplexing unit 23. The decoded stream forming unit specifies each scene video which is a hatched portion in the slave stream of FIG. 6. The decoded stream forming unit 24 then forms a decoded stream by embedding the coded data extracted from the master stream at the position of the corresponding scene video of the slave stream (step ST26).

Because the frame at the head of a scene in the coded data extracted from the master stream typically does not match the head of the scene of the slave stream with respect to time, as shown in FIG. 6, the time information of the coded data corresponding to each picture (access unit) of the extracted master stream is converted in such a way that the frame at the head of the scene matches the head of the scene of the slave stream, and is added to the slave stream. With this structure, the decoded stream can be formed as, for example, a stream in which the master stream is defined as a base view (a stream in the form of MVC (multi view coding) defined by the recommendation Annex H of H.264).

After the decoded stream forming unit 24 forms the decoded stream, the slave video decoding unit 25 carries out the predetermined decoding process on the decoded stream to generate a reproduced image corresponding to the slave coded data (step ST27).

As can be seen from the above description, the image coding device in accordance with this Embodiment 1 is constructed in such a way that the scene correlation measurement parameter calculating unit 1 that determines a scene correlation measurement parameter which serves as a measure for measuring a correlation between each scene video in an MPEG-2 video bit stream and another scene video, the H.264 converting unit 4 that converts the MPEG-2 video bit stream into a video bit stream compliant with an H.264 video coding method, and the inter-scene prediction determining unit 5 that retrieves coded data which is to be used for prediction reference when the intra-scene and inter-scene adaptive coding unit 6 carries out prediction coding, instead of the coded data about each scene video unit in the MPEG-2 video bit stream, from the coded data about scene video units in the master stream recorded in the data recording unit 2 on the basis of the scene correlation measurement parameter A or B determined by the scene correlation measurement parameter calculating unit 1 are disposed, and the intra-scene and inter-scene adaptive coding unit 6 converts the MPEG-2 video bit stream into a slave stream by using both coded data which is included in the coded data about scene video units in the master stream recorded in the data recording unit 2 and for which alternative coded data to be used for the prediction reference has not been retrieved by the inter-scene prediction determining unit 5, and the coded data retrieved by the inter-scene prediction determining unit 5 for the prediction reference. Therefore, there is provided an advantage of providing the image coding device that can carryout efficient compression without causing an increase in the amount of information processed and degradation in the video quality.

Further, according to this Embodiment 1, the image decoding device is constructed in such a way that the decoded stream forming unit 24 that reads the master stream indicated by the master stream ID included in the slave stream coding management information demultiplexed by the demultiplexing unit 23 from among a plurality of master streams recorded in the data recording unit 2, extracts the coded data about the scene video indicated by each master scene ID included in the slave stream coding management information from the master stream, and embeds the coded data at the position of the corresponding scene video of the slave stream demultiplexed by the demultiplexing unit 23 to form a decoded stream is disposed, and the slave video decoding unit 25 carries out the predetermined decoding process on the decoded stream formed by the decoded stream forming unit 24 to generate a reproduced image corresponding to the slave coded data. Therefore, there is provided an advantage of providing the image decoding device that can decode an image compressed efficiently.

In accordance with this Embodiment 1, although the case in which the video bit stream inputted to the image decoding device is an MPEG-2 video bit stream, and a coding method of coding the MPEG-2 video bit stream is converted through the intra-scene and inter-scene adaptive predictive coding process using H.264 is shown, the video bit stream inputted to the image decoding device is not limited to an MPEG-2 video bit stream. For example, the video bit stream inputted to the image decoding device can have any type of video coding format such as MPEG-4 visual (ISO/IEC 14496-2) or H.264 (ISO/IEC 14496-10). Further, the coding method used for the transform coding is not limited to H.264.

Further, the scene correlation measurement parameter determined by the scene correlation measurement parameter calculating unit 1 can be constructed in such a way as to be defined on the basis of the video coding format of the video bit stream inputted to the image decoding device. Further, as the coded data format of the video signal corresponding to the slave coded data, MVC defined by the recommendation Annex H of H.264 is provided as an example. The coded data format of the video signal corresponding to the slave coded data is not limited to the MVC form. The coded data format of the video signal corresponding to the slave coded data can be constructed in such a way as to comply with another similar standard coding method according to the structures of the image coding device and the image decoding device in accordance with this Embodiment 1.

Embodiment 2

In above-mentioned Embodiment 1, the example in which an "MPEG-2 video bit stream" to be recompressed as a master stream or an "MPEG-2 video bit stream" to be recompressed as a slave stream is inputted to the scene correlation measurement parameter calculating unit 1 is shown. As an alternative, an "MPEG-2 video bit stream" to be recompressed as a master stream and an "MPEG-2 video bit stream" to be recompressed as a slave stream can be included in a single video bit stream, and this single video bit stream can be inputted to the scene correlation measurement parameter calculating unit 1.

Figure 8:
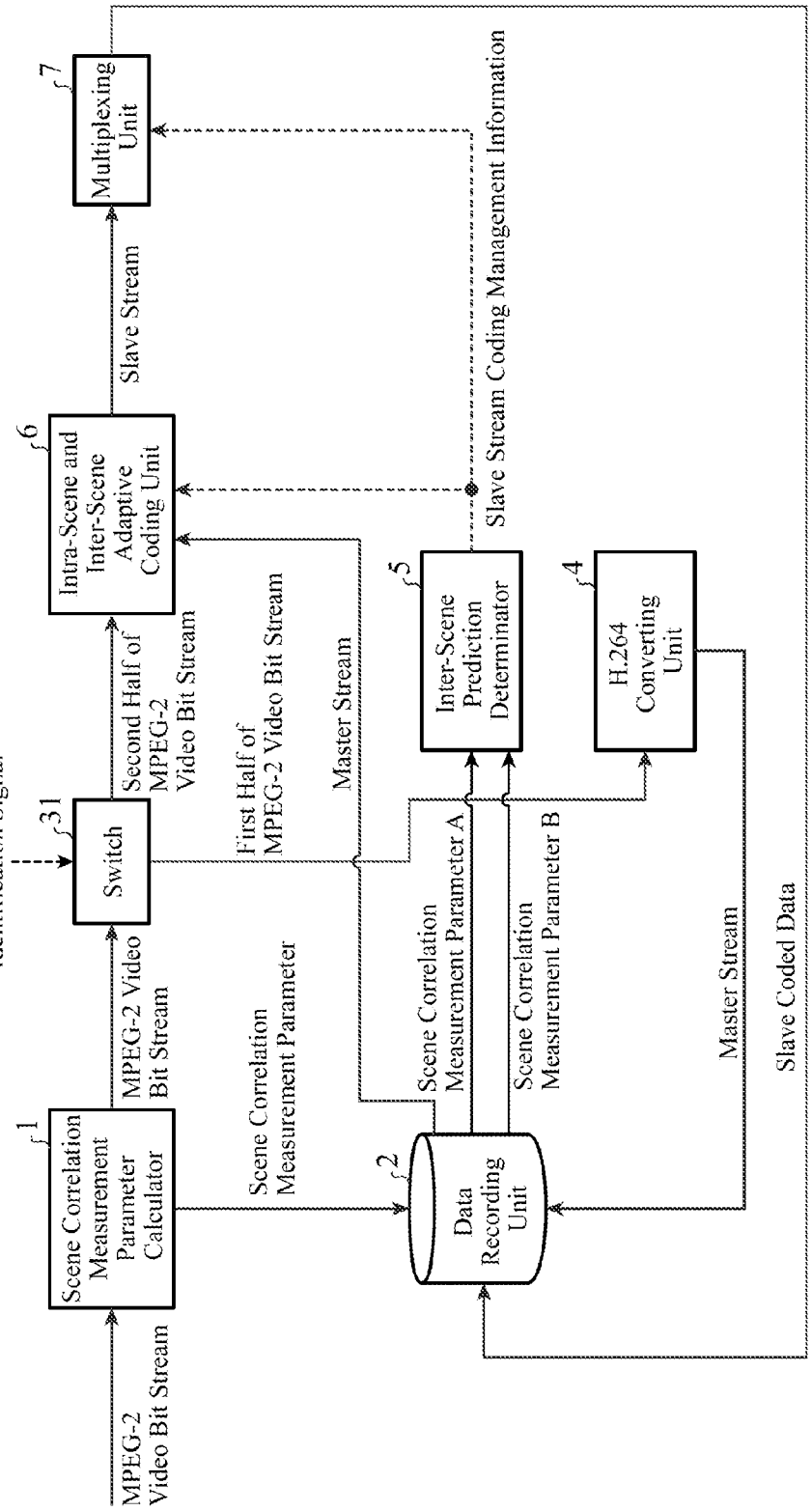
FIG. 8 is a block diagram showing an image coding device in accordance with Embodiment 2 of the present invention.

FIG. 8 is a block diagram showing an image coding device in accordance with Embodiment 2 of the present invention. In the figure, because the same reference numerals as those shown in FIG. 1 denote the same components or like components, the explanation of the components will be omitted hereafter. A switch 31 carries out a process of, when a recompression method identification signal provided from outside the image coding device shows "a first half of an MPEG-2 video bit stream inputted to a scene correlation measurement parameter calculating unit 1 is a video bit stream to be recompressed as a master stream, and a second half of the MPEG-2 video bit stream is a video bit stream to be recompressed as a slave stream", dividing the MPEG-2 video bit stream outputted from the scene correlation measurement parameter calculating unit 1 into first and second halves, and providing the first half of the MPEG-2 video bit stream to an H.264 converting unit 4 while providing the second half of the MPEG-2 video bit stream to an intra-scene and inter-scene adaptive coding unit 6. The switch 31 constructs a coded data divider.

Figure 9:
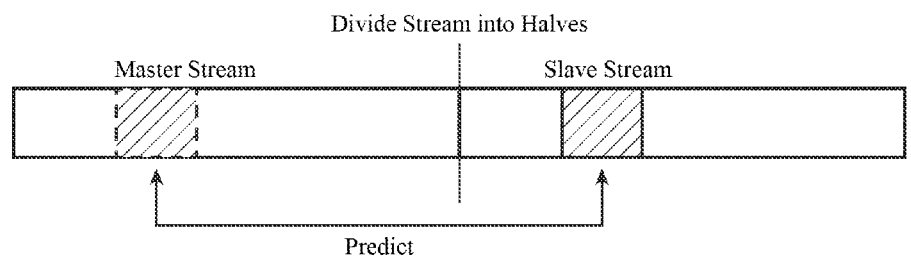
FIG. 9 is an explanatory drawing showing a single video bit stream including an "MPEG-2 video bit stream" to be recompressed as a master stream and an "MPEG-2 video bit stream" to be recompressed as a slave stream.

Next, the operation of the image coding device will be explained. Although the example in which an "MPEG-2 video bit stream" to be recompressed as a master stream or an "MPEG-2 video bit stream" to be recompressed as a slave stream is inputted to the scene correlation measurement parameter calculating unit 1 is shown in above-mentioned Embodiment 1, an example in which an "MPEG-2 video bit stream" to be recompressed as a master stream and an "MPEG-2 video bit stream" to be recompressed as a slave stream are included in a single video bit stream, and this single video bit stream is inputted to the scene correlation measurement parameter calculating unit 1 will be explained in this Embodiment 2, as shown in FIG. 9.

Processing which is carried out when the single video bit stream is inputted to the scene correlation measurement parameter calculating unit 1 differs from that carried out by the image decoding device shown in FIG. 1 only in the process carried out by the switch 31. The recompression method identification signal is inputted to the switch 31 from outside the image coding device, the recompression method identification signal showing that "a first half of an MPEG-2 video bit stream inputted to the scene correlation measurement parameter calculating unit 1 is a video bit stream to be recompressed as a master stream, and a second half of the MPEG-2 video bit stream is a video bit stream to be recompressed as a slave stream."

When an MPEG-2 video bit stream is outputted from the scene correlation measurement parameter calculating unit 1 after the above-mentioned recompression method identification signal is provided thereto from outside the image coding device, the switch 31 divides the MPEG-2 video bit stream into a first half and a second half, provides the first half of the MPEG-2 video bit stream to the H.264 converting unit 4, and provides the second half of the MPEG-2 video bit stream to the intra-scene and inter-scene adaptive coding unit 6.

Although a detailed explanation of the processing carried out by the image coding device will be omitted hereafter because the processing carried out by the image coding device other than the process performed by the switch 31 is the same as that carried out by the image coding device according to above-mentioned Embodiment 1, the first half of the MPEG-2 video bit stream is provided to the H.264 converting unit 4 so that the first half of the MPEG-2 video bit stream is converted into a video bit stream compliant with an H.264 video coding method, and the video bit stream is recorded in a data recording unit 2 as a master stream. On the other hand, the second half of the MPEG-2 video bit stream is provided to the intra-scene and inter-scene adaptive coding unit 6 so that the second half of the MPEG-2 video bit stream is converted into a slave stream, and slave coded data into which the slave stream and slave stream coding management information outputted from an inter-scene prediction determining unit 5 are multiplexed is recorded in the data recording unit 2.

Figure 10:
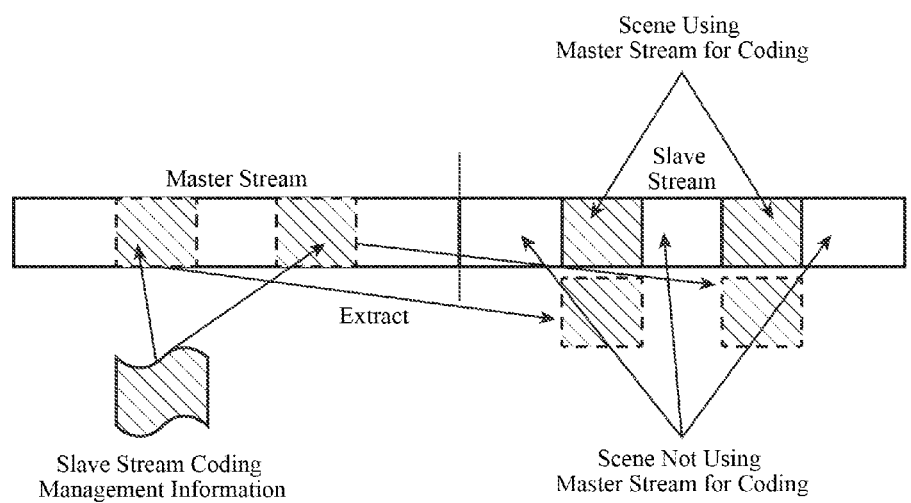
FIG. 10 is an explanatory drawing showing a state of extracting coded data about a scene video indicated by slave stream coding management information from a master stream.

Processing carried out by an image decoding device is the same as that carried out by the image decoding device in accordance with above-mentioned Embodiment 1. The image decoding device extracts the coded data about the scene video indicated by the slave stream coding management information from the master stream recorded in the data recording unit 2 (refer to FIG. 10), forms a decoded stream by embedding the coded data about the scene video at the position of a corresponding scene video of the slave stream, and carries out a decoding process of decoding an image. For example, while one TV program or the like includes a scene video having a high correlation with another scene video in many cases, a scene video having a high correlation with another scene video can be retrieved efficiently in the case in which a master stream and a slave stream are included in a single video bit stream, as mentioned above.

Figure 11:
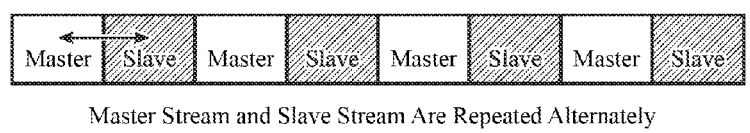
FIG. 11 is an explanatory drawing showing a single MPEG-2 video bit stream in which a master stream and a slave stream are repeated alternately.

Although the example in which an MPEG-2 video bit stream inputted to the scene correlation measurement parameter calculating unit 1 is divided into a first half of the MPEG-2 video bit stream, which is to be recompressed as a master stream, and a second half of the MPEG-2 video bit stream, which is to be recompressed as a slave stream, is shown in this Embodiment 2. As an alternative, a single MPEG-2 video bit stream in which a master stream and a slave stream are repeated alternately can be inputted to the scene correlation measurement parameter calculating unit 1, as shown in FIG. 11. In general, the coding efficiency in a case of making a prediction from a scene video closer in time is greater than that in a case of making a prediction from a scene video further in time. As shown in FIG. 11, because in the case in which a master stream and a slave stream are repeated alternately, the temporal distance between the master stream and the slave stream becomes shorter, a stream having a high degree of coding efficiency can be generated.

Figure 12:
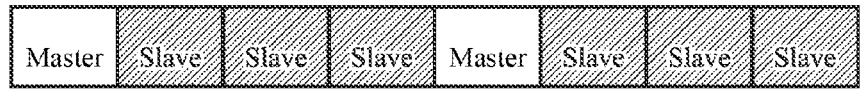
FIG. 12 is an explanatory drawing showing an MPEG-2 video bit stream in which the temporal length of master streams differs from that of slave streams.

Although the example in which a master stream and a slave stream are repeated alternately is shown in this embodiment, the temporal length of master streams may differ from that of slave streams, as shown in FIG. 12. Because the number of master streams in the MPEG-2 video bit stream is two and the number of slave streams in the MPEG-2 video bit stream is six in the example of FIG. 12, the temporal length of slave streams is three times as long as that of master streams. Because the number of scene videos on which coding using an inter-scene correlation is carried out increases by making the temporal length of slave streams longer than that of master streams in this way, contribution is made to an improvement in the coding efficiency. At this time, information about the length of master streams and information about the length of slave streams can be multiplexed into coding management information about master scenes.

Figure 13:
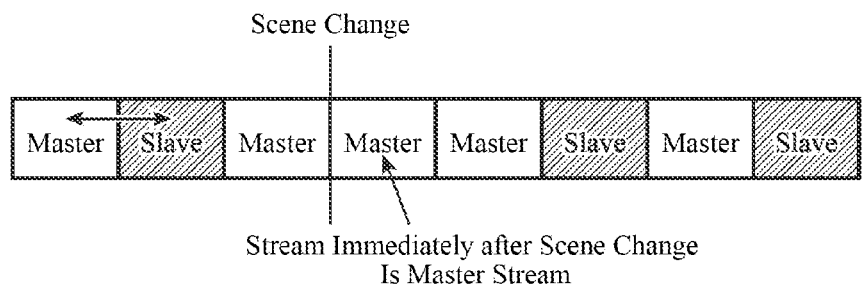
FIG. 13 is an explanatory drawing showing an MPEG-2 video bit stream in which a scene video immediately after a scene change is a master stream.

However, there is a possibility that a scene change is included in the sequence which is the target to be coded when the MPEG-2 video bit stream has such a form as above. Because there is a high possibility that there is no correlation between scene videos before and after a scene change, reduction of the coding efficiency due to a scene change can be prevented if the scene video just after the scene change is a master stream, as shown in FIG. 13. Therefore, an MPEG-2 video bit stream in which a scene video just after a scene change is certainly a master stream can be inputted to the scene correlation measurement parameter calculating unit 1.

Figure 14:
FIG. 14 is an explanatory drawing showing a flag showing whether each stream included in a single MPEG-2 video bit stream is a master stream or a slave stream.

Although the example in which a master stream and a slave stream are included in a single MPEG-2 video bit stream is shown in this Embodiment 2, a flag showing whether each stream included in the single MPEG-2 video bit stream is a master stream or a slave stream for each predetermined unit (e.g., for each GOP) can be signaled to the image decoding device as the coding management information about master scenes, as shown in FIG. 14. For example, a multiplexing unit 7 which constructs a flag notifier can signal the coding management information to the image decoding device by recording the coding management information in the data recording unit 2, or can signal the coding management information to the image decoding device by transmitting the coding management information to the image decoding device. By doing in this way, the image coding device can freely determine whether each stream included in the single MPEG-2 video bit stream is a master stream or a slave stream according to the characteristics of the video, thereby being able to improve the coding efficiency.

Figure 15:
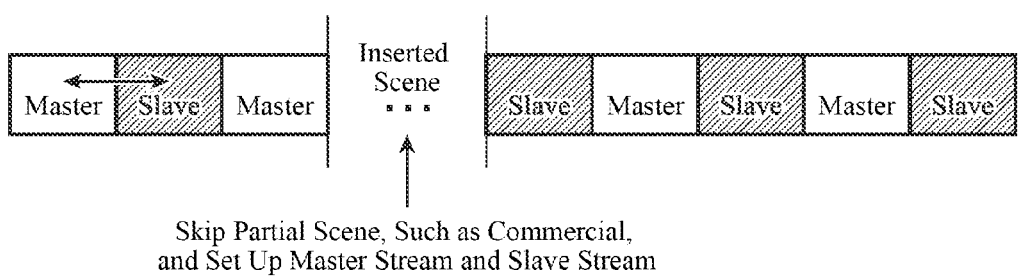
FIG. 15 is an explanatory drawing showing an MPEG-2 video bit stream in which a scene video whose characteristics clearly differ from those of a scene video currently being coded is skipped.

Further, as shown in FIG. 15, there is a possibility that a scene video (e.g., a commercial during a TV program) whose characteristics clearly differ from those of a scene video currently being coded is inserted into the sequence. In such a case, there can be considered a method of detecting a scene video whose characteristics clearly differ from those of a scene video currently being coded in advance, and detecting a scene correlation measurement parameter in closed loop within the scene video and then coding the scene correlation measurement parameter. Because the number of scene videos for which a scene correlation measurement parameter is to be detected can be reduced and the amount of information processed can be reduced by doing in this way, an MPEG-2 video bit stream in which scene videos whose characteristics clearly differ from those of a scene video currently being coded are skipped (the streams of the scene videos are not included) can be inputted to the scene correlation measurement parameter calculating unit 1.

Although the example in which an MPEG-2 video bit stream is converted into a video bit stream compliant with an H.264 video coding method and the video bit stream is recorded in the data recording unit 2 as a master stream is shown in this Embodiment 2, the video coding method is not limited to the H.264 video coding method. For example, another video coding method, such as MPEG-4, can be used. Further, although the input bitstream is an MPEG-2 video bit stream, the input bitstream is not limited to an MPEG-2 video bit stream. For example, a video bit stream coded by using another video coding method, such as MPEG-4 or H.264, can be used as an input.

Although no mention is made in above-mentioned Embodiments 1 and 2, there is a case in which each of the image coding and decoding devices includes a function of editing a master stream or slave coded data recorded in the data recording unit 2 (e.g., the function corresponds to a processor, such as a CPU, that has a man machine interface, such as a keyboard or a mouse, and that edits a master stream or slave coded data according to operation information accepted by the man machine interface). However, there can occur a state in which a user's operation on the editing function causes a deletion of a master stream.

To solve this problem, the editing functions of the image coding device and the image decoding device can be constructed in such a way as to, when an operation of deleting a master stream is performed, display a warning message saying that "operation of deleting a master stream is currently being performed" on a display. Further, there can be provided a method of preventing the decoding from becoming impossible because of a deletion of a master stream by carrying out a process of performing recoding or the like for a prediction from the master stream.

Embodiment 3

Figure 16:
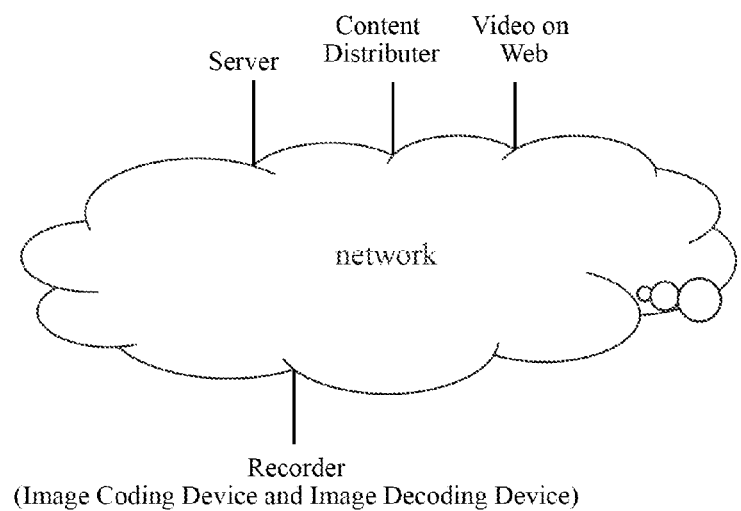
FIG. 16 is a block diagram showing an example of a system in which records (an image coding device and an image decoding device) are connected to a network.

Although the example in which a master stream and slave coded data are recorded in the data recording unit 2 is shown in above-mentioned Embodiments 1 and 2, a master stream can be recorded in an external device disposed outside the image coding device and the image decoding device without being recorded in the data recording unit 2. FIG. 16 is a block diagram showing an example in which records (an image coding device and an image decoding device) of a system are connected to a network.

In the example shown in FIG. 16, an H.264 converting unit 4 of the image coding device which is a recorder can transfer a master stream to a server (e.g., a public server, a dedicated server provided by a service provider, or a server own by an individual), which is an external device, via a network interface without recording the master stream in a data recording unit 2, and the server can record the master stream.

For example, a master stream recorded in the server can be prevented from being deleted erroneously and hence becoming unable to be decoded if the master stream is set to have a structure which cannot be deleted through a user's operation. Further, the system can be constructed in such a way as to disclose the master stream for an administrator of the server only when the administrator is a specific user. By constructing the system this way, secure video management can be accomplished.

Embodiment 4

Figure 17:
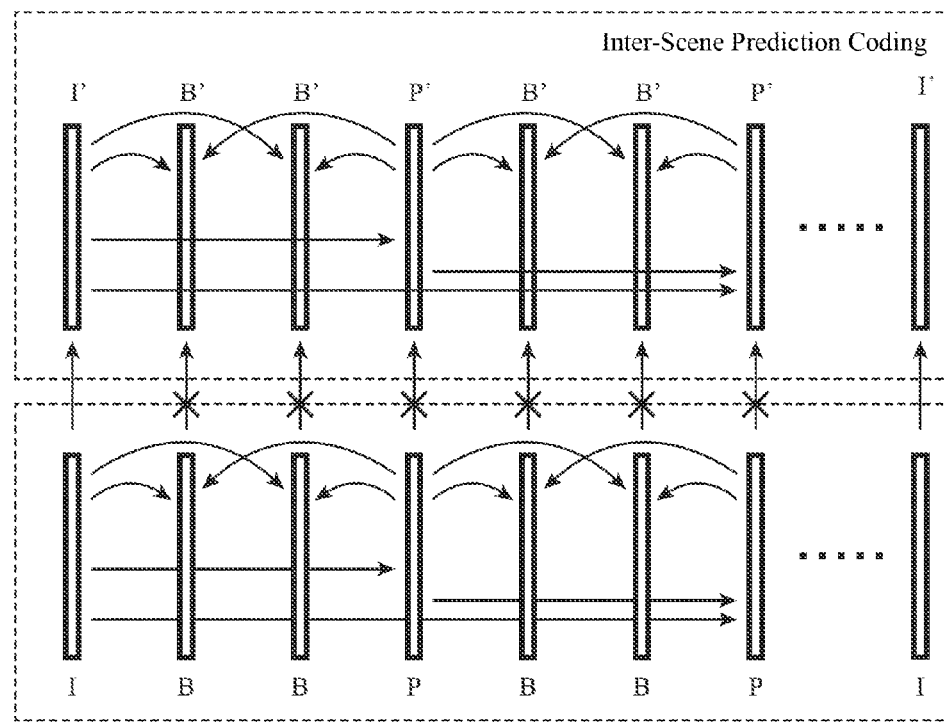
FIG. 17 is an explanatory drawing showing an example of conversion of only I pictures.
Figure 18:
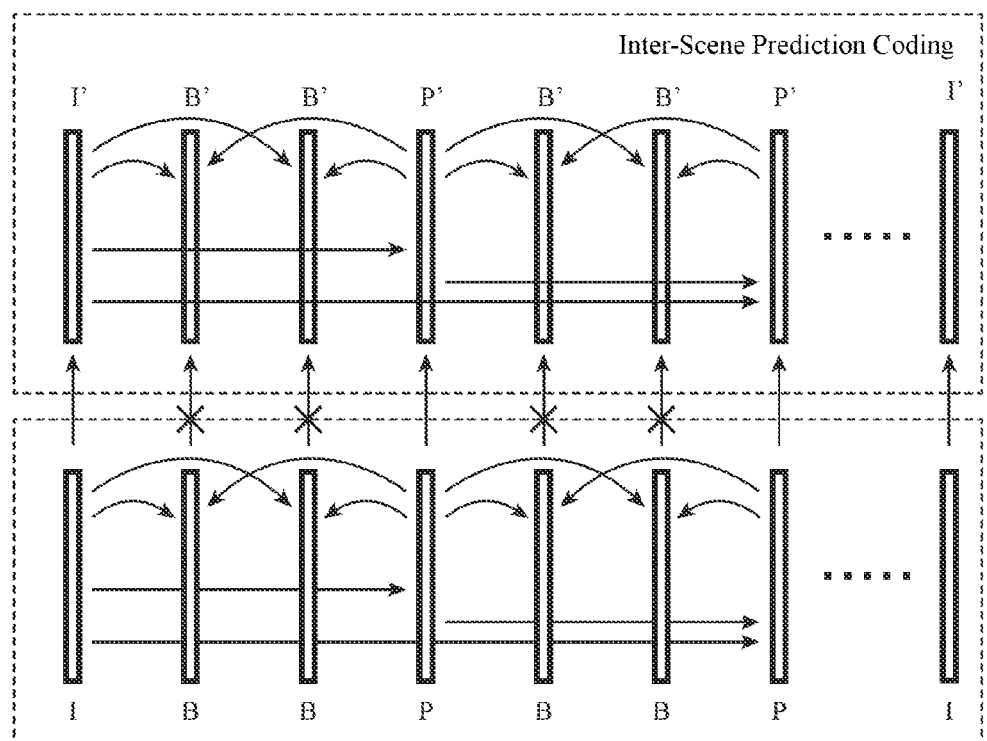
FIG. 18 is an explanatory drawing showing an example of conversion of only I and P pictures.

Although the example in which when receiving a decoded image from the switch 12, the inter-scene prediction coding unit 15 performs an H.264 motion compensation process or a compression coding process using an intra prediction by using the time correlation of the decoded image and the correlation between the decoded image and image data about an image at the same time position in the master stream decoded image generated by the inter-scene prediction reference point extracting unit 13, and outputs inter-scene prediction coded data which is the result of the process is shown in above-mentioned Embodiment 1 (an inter-scene prediction from a picture corresponding to the same time position can be performed for each of I, P, and B pictures), an inter-scene prediction can be performed only for I pictures, as shown in FIG. 17. As an alternative, an inter-scene prediction can be performed only for I and P pictures, as shown in FIG. 18. By limiting inter-scene predictions, when coding a scene video having a high correlation with another scene video, the amount of information processed can be reduced at the time of conversion while the coding efficiency falls.

Further, the inter-scene prediction coding unit 15 can switch between the process (refer to FIG. 17) of performing an inter-scene prediction only on I pictures and the process (refer to FIG. 18) of performing an inter-scene prediction only on I and P pictures according to the correlation degree of the scene. For example, the inter-scene prediction coding unit is constructed in such a way as to perform an inter-scene prediction on only an I picture at the head of a scene when only a head portion of a scene video has a high correlation with another scene video, such as when there is a scene change at some midpoint in the scene, and, when the nearly same scenes are included, perform an inter-scene prediction on all I, P, and B pictures. In this case, there is provided an advantage of being able to reduce the amount of information processed without decreasing the coding efficiency.

FIG. 19 is a flow chart showing processing carried out by an image coding device in accordance with Embodiment 4 of the present invention. Hereafter, the processing shown in FIG. 19 will be explained. When receiving an MPEG-2 video bit stream compression-coded by using an MPEG-2 video coding method, a scene correlation measurement parameter calculating unit 1 determines a scene correlation measurement parameter which serves as a measure for measuring a correlation between each scene video of the MPEG-2 video bit stream and another scene video (step ST31), like that in accordance with above-mentioned Embodiment 1.

When a recompression method identification signal provided from outside the image coding device shows "recompress an MPEG-2 video bit stream as a master stream" (step ST32), a switch 3 provides the MPEG-2 video bit stream outputted thereto from the scene correlation measurement parameter calculating unit 1 to an H.264 converting unit 4, like that in accordance with above-mentioned Embodiment 1. In contrast, when the recompression method identification signal shows "recompress an MPEG-2 video bit stream as a slave stream" (step ST32), the switch provides the MPEG-2 video bit stream outputted thereto from the scene correlation measurement parameter calculating unit 1 to an intra-scene and inter-scene adaptive coding unit 6, like that in accordance with above-mentioned Embodiment 1.

When the MPEG-2 video bit stream is provided thereto from the switch 3, the H.264 converting unit 4 converts the MPEG-2 video bit stream into a video bit stream compliant with an H.264 video coding method according to a predetermined processing procedure, and records the video bit stream in a data recording unit 2 as a master stream (step ST33).

When the scene correlation measurement parameter calculating unit 1 determines a scene correlation measurement parameter A or a scene correlation measurement parameter B, an inter-scene prediction determining unit 5 retrieves coded data which is to be used for prediction reference, instead of the coded data about each scene video unit in the MPEG-2 video bit stream, from the coded data about scene video units in the master stream recorded in the data recording unit 2 on the basis of the scene correlation measurement parameter A or B. Hereafter, the retrieving process of retrieving coded data which is carried out by the inter-scene prediction determining unit 5 will be explained concretely.

First, the inter-scene prediction determining unit 5 measures a correlation between each scene video in the MPEG-2 video bit stream and each scene video in the master stream recorded in the data recording unit 2 by using the scene correlation measurement parameter A or B determined by the scene correlation measurement parameter calculating unit 1, like that in accordance with above-mentioned Embodiment 1. Next, as to each scene video in the MPEG-2 video bit stream, the inter-scene prediction determining unit 5 makes a comparison among correlations between the above-mentioned scene video and each scene video in the master stream, and retrieves a scene video having the largest correlation value in the master stream. After retrieving a scene video having the largest correlation value in the master stream, the inter-scene prediction determining unit 5 decides the coded data about the scene video as the scene video to be used for the prediction reference when the correlation value is equal to or larger than a predetermined value which is set in advance, like that in accordance with above-mentioned Embodiment 1. In contrast, when the correlation value is smaller than the predetermined value which is set in advance, the inter-scene prediction determining unit does not use the coded data about the scene video in the master stream for the prediction reference.

When coded data which the intra-scene and inter-scene adaptive coding unit 6 uses for the prediction reference is found (when there exists a scene video having a high correlation with a scene video in the MPEG-2 video bit stream in the master stream), the inter-scene prediction determining unit 5 outputs slave stream coding management information showing "carry out coding on the scene which is the target for processing by using the coded data about a scene video having a high correlation in the master stream" to the intra-scene and inter-scene adaptive coding unit 6 and a multiplexing unit 7, like that in accordance with above-mentioned Embodiment 1. In contrast, when coded data which the intra-scene and inter-scene adaptive coding unit 6 uses for the prediction reference is not found (when there does not exist a scene video having a high correlation with a scene video in the MPEG-2 video bit stream in the master stream), the inter-scene prediction determining unit 5 outputs slave stream coding management information showing "carry out coding in closed loop within the scene on the scene which is the target for processing without using any coded data in the master stream" to the intra-scene and inter-scene adaptive coding unit 6 and the multiplexing unit 7, like that in accordance with above-mentioned Embodiment 1.

The intra-scene and inter-scene adaptive coding unit 6 converts the MPEG-2 video bit stream into a slave stream by using both coded data which is included in the coded data about scene video units in the master stream recorded in the data recording unit 2 and for which alternative coded data to be used for the prediction reference has not been retrieved by the inter-scene prediction determining unit 5, and the coded data retrieved by the inter-scene prediction determining unit 5 for the prediction reference. Hereafter, the conversion process of converting the stream which is carried out by the intra-scene and inter-scene adaptive coding unit 6 will be explained concretely.

First, when an MPEG-2 video bit stream is provided thereto from the switch 3, an MPEG-2 decoding unit 11 of the intra-scene and inter-scene adaptive coding unit 6 performs a decoding process on the coded data about each scene video in the MPEG-2 video bit stream to generate a decoded image about each scene video, like that in accordance with above-mentioned Embodiment 1 (step ST34).

When the inter-scene prediction specification flag included in the slave stream coding management information outputted from the inter-scene prediction determining unit 5 shows that the coded data about a scene video unit in the master stream is not used for the prediction reference, a switch 12 outputs the decoded image generated by the MPEG-2 decoding unit 11 to an intra-scene prediction coding unit 14. When the inter-scene prediction specification flag shows that the coded data about a scene video unit in the master stream is used for the prediction reference, the switch outputs the decoded image generated by the MPEG-2 decoding unit 11 to an inter-scene prediction coding unit 15, like that in accordance with above-mentioned Embodiment 1.

When the inter-scene prediction specification flag included in the slave stream coding management information outputted from the inter-scene prediction determining unit 5 shows that the coded data about a scene video unit in the master stream is used for the prediction reference, an inter-scene prediction reference point extracting unit 13 extracts the coded data about the scene video indicated by each master scene ID from the master stream indicated by the master stream ID included in the slave stream coding management information, like that in accordance with above-mentioned Embodiment 1. After extracting the coded data about the scene video indicated by each master scene ID, the inter-scene prediction reference point extracting unit 13 carries out an H.264 decoding process on the coded data to generate a master stream decoded image which is the decoded image of the scene video, like that in accordance with above-mentioned Embodiment 1.

When receiving the decoded image from the switch 12, the inter-scene prediction coding unit 15 limits the use of a scene correlation only to I pictures when, for example, the correlation degree of the scene is lower than a first correlation degree which is a preset threshold (e.g., when there is a scene change at some midpoint in the scene) (step ST35), and performs an inter-scene prediction only on I pictures and carries out recoding, as shown in FIG. 17 (step ST36). Further, when, for example, the correlation degree of the scene is equal to or higher than the first correlation degree, but is lower than a second correlation degree which is a preset threshold, the inter-scene prediction coding unit 15 limits the use of a scene correlation only to I and P pictures (steps STST35 and ST37), and performs an inter-scene prediction only on I and P pictures and carries out recoding, as shown in FIG. 18 (step ST38).

Further, when, for example, the correlation degree of the scene is equal to or higher than the second correlation degree, the inter-scene prediction coding unit 15 enables the use of a scene correlation for all of I, P, and B pictures (step ST37), and performs an inter-scene prediction on all of I, P, and B pictures and carries out recoding (step ST39). After carrying out inter-scene predictions and recoding, the inter-scene prediction coding unit 15 outputs inter-scene prediction coded data which is the result of the recoding to a slave stream multiplexing unit 16.

When receiving the decoded image from the switch 12, the intra-scene prediction coding unit 14 performs an H.264 compression coding process on the decoded image without using any coded data in the master stream, and outputs an intra-scene prediction coded data which is the result of the coding process, like that in accordance with above-mentioned Embodiment 1.

The slave stream multiplexing unit 16 multiplexes the intra-scene prediction coded data outputted from the intra-scene prediction coding unit 14 and the inter-scene prediction coded data outputted from the inter-scene prediction coding unit 15 to generate a slave stream, and outputs the slave stream to the multiplexing unit 7, like that in accordance with above-mentioned Embodiment 1 (step ST40). The multiplexing unit 7 multiplexes the slave stream converted by the intra-scene and inter-scene adaptive coding unit 6 and the slave stream coding management information outputted from the inter-scene prediction determining unit 5, and records the result of the multiplexing in the data recording unit 2 as slave coded data, like that in accordance with above-mentioned Embodiment 1 (step ST41).

As can be seen from the above description, in accordance with this Embodiment 4, the inter-scene prediction coding unit 15 is constructed in such a way as to switch between the process of performing an inter-scene prediction only on I pictures and the process of performing an inter-scene prediction only on I and P pictures according to the correlation degree of the scene. There is provided an advantage of being able to simplify the processing by reusing stream information (mode information, motion information, etc.) on which recoding has not been performed yet for pictures on each of which no inter-scene prediction is carried out. By carrying out such a process, the amount of information processed which is caused by recoding can be reduced while the coding efficiency falls. This embodiment is useful particularly for a low-power system using a low CPU, such as a built-in device.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

Because the image coding device in accordance with the present invention includes a video coded data converter that converts each scene video data in video coded data compliant with a first video coding method into video coded data compliant with a second video coding method by selectively applying a prediction reference using other scene video data to each scene video data, wherein when converting coded data about each scene video unit in first video coded data, and can carry out efficient compression without causing an increase in amount of processed information and degradation in the video quality, the image coding device in accordance with the present invention is suitable for use as an image coding device, such as a digital recording device with a built-in HDD or a cloud type system.

EXPLANATIONS OF REFERENCE NUMERALS

1 scene correlation measurement parameter calculating unit (scene correlation measurement parameter calculator), 2 data recording unit (data recorder), 3 switch, 4 H.264 converting unit (first video coded data converter), 5 inter-scene prediction determining unit (scene image retrieving unit), 6 intra-scene and inter-scene adaptive coding unit (second video coded data converter), 7 multiplexing unit, 11 MPEG-2 decoding unit, 12 switch, 13 inter-scene prediction reference point extracting unit, 14 intra-scene prediction coding unit, 15 inter-scene prediction coding unit, 16 slave stream multiplexing unit, 21 switch, 22 H.264 decoding unit (first video decoder), 23 demultiplexing unit (second video decoder), 24 decoded stream forming unit (second video decoder), 25 slave video decoding unit (second video decoder), 31 switch (coded data divider).

The invention claimed is:

1. An image coding device including a video coded data converter that converts each scene video data in video coded data compliant with a first video coding method into video coded data compliant with a second video coding method by selectively applying a prediction reference using other scene video data to said each scene video data, wherein when converting coded data about each scene video unit in first video coded data, said video coded data converter retrieves coded data about another scene video unit which is to be used for prediction reference, determines whether or not to use the coded data about the scene video unit which said video coded data converter has retrieved for the prediction reference, and converts the coded data about said first scene video unit into video coded data compliant with the second video coding method, and also generates metadata showing whether or not the coded data about the scene video unit which said video coded data converter has retrieved is used for the prediction reference.

2. The image coding device according to claim 1, wherein said video coded data converter includes a scene correlation measurement parameter calculator that calculates a scene correlation measurement parameter which serves as a measure for measuring a correlation between each scene video in the first video coded data and another scene video, and retrieves coded data about another scene video unit which is to be used for the prediction reference when converting the coded data about each scene video unit in the first video coded data on a basis of a parameter value which is outputted from said scene correlation measurement parameter calculator.

3. The image coding device according to claim 1, wherein said image coding device includes a data recorder that multiplexes said metadata into the video coded data compliant with the second video coding method into which each scene video data is converted by said video coded data converter, and records said metadata.

4. The image coding device according to claim 1, wherein said video coded data converter records the video coded data which is a source of retrieval and the video coded data compliant with the second video coding method into which each scene video data is converted by using the retrieved coded data about the scene video unit for the prediction reference in different devices connected thereto via a network.

5. An image decoding device that carries out a decoding process on video coded data to generate a reproduced image, said image decoding device comprising:
   a determinator that determines whether or not coded data about each scene video unit of video coded data is coded by making a prediction reference to coded data about another scene video unit on a basis of metadata inputted separately for said coded data about each scene video unit, and that, when determining that the coded data about a scene video unit is coded by making a prediction reference to coded data about another scene video unit, also specifies a location of the coded data of the other scene video unit which is to be used for the prediction reference; and
   a decoder that, when a result of the determination by said determinator shows that the coded data about a scene video unit is coded by making a prediction reference to coded data about another scene video unit, acquires the coded data which is a destination of the prediction reference from the location specified by said determinator, and carries out a decoding process on said coded data, as well as the coded data of the scene video unit which is a target to be decoded,
  wherein said metadata includes identification information for identifying video coded data in which said coded data about another scene video unit is included.

6. An image coding method including a step of a video coded data converter converting each scene video data in video coded data compliant with a first video coding method into video coded data compliant with a second video coding method by selectively applying a prediction reference using other scene video data to said each scene video data, wherein said image coding method includes a step of, when converting coded data about each scene video unit in first video coded data, retrieving coded data about another scene video unit which is to be used for prediction reference, determining whether or not to use the coded data about the scene video unit which has been retrieved for the prediction reference, and converting the coded data about said first scene video unit into video coded data compliant with the second video coding method, and also generating metadata showing whether or not the coded data about the scene video unit which has been retrieved is used for the prediction reference by using said video coded data converter.

7. An image decoding method of carrying out a decoding process on video coded data to generate a reproduced image, said image decoding method comprising: a determination processing step of a determinator determining whether or not coded data about each scene video unit of video coded data is coded by making a prediction reference to coded data about another scene video unit on a basis of metadata inputted separately for said coded data of each scene video unit, and, when determining that the coded data about a scene video unit is coded by making a prediction reference to coded data about another scene video unit, also specifying a location of the coded data of the other scene video unit which is to be used for the prediction reference; and a decode processing step of when a result of the determination in said determination processing step shows that the coded data about a scene video unit is coded by making a prediction reference to coded data about another scene video unit, a decoder acquiring the coded data which is a destination of the prediction reference from the location specified in said determination processing step, and carrying out a decoding process on said coded data, as well as the coded data of the scene video unit which is a target to be decoded,
   wherein said metadata includes identification information for identifying video coded data in which said coded data about another scene video unit is included.

\* \* \* \* \*